(12) United States Patent
Kusashima et al.

(10) Patent No.: US 12,035,368 B2
(45) Date of Patent: Jul. 9, 2024

(54) BASE STATION, TERMINAL DEVICE, METHOD, AND APPARATUS

(71) Applicant: SONY GROUP CORPORATION, Tokyo (JP)

(72) Inventors: Naoki Kusashima, Tokyo (JP); Hiromasa Uchiyama, Tokyo (JP); Hiroki Matsuda, Tokyo (JP); Yifu Tang, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 11 days.

(21) Appl. No.: 17/287,984

(22) PCT Filed: Oct. 21, 2019

(86) PCT No.: PCT/JP2019/041334
§ 371 (c)(1),
(2) Date: Apr. 22, 2021

(87) PCT Pub. No.: WO2020/090548
PCT Pub. Date: May 7, 2020

(65) Prior Publication Data
US 2021/0378012 A1 Dec. 2, 2021

(30) Foreign Application Priority Data
Nov. 1, 2018 (JP) .................... 2018-206703

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC ................................. H04W 74/0866
See application file for complete search history.

(56) References Cited

U.S. PATENT DOCUMENTS

| | | | | |
|---|---|---|---|---|
| 5,805,581 A | * | 9/1998 | Uchida | H04B 7/18532 370/335 |
| 2009/0080366 A1 | * | 3/2009 | Shao | H04B 7/15542 370/315 |

(Continued)

FOREIGN PATENT DOCUMENTS

| | | |
|---|---|---|
| CN | 105577339 A | 5/2016 |
| CN | 107211277 A | 9/2017 |

(Continued)

OTHER PUBLICATIONS

International Search Report and Written Opinion of PCT Application No. PCT/JP2019/041334, dated Nov. 26, 2019, 13 pages of ISRWO.

(Continued)

*Primary Examiner* — James P Duffy
(74) *Attorney, Agent, or Firm* — CHIP LAW GROUP

(57) ABSTRACT

There is proposed a mechanism that makes it possible to achieve fair channel access between a plurality of nodes. A base station including a control unit that notifies a terminal device of setting information regarding a channel access scheme to be used and carrier sense. The terminal device is configured to use, as channel access schemes, a first scheme in which the terminal device performs carrier sense at any timing and a second scheme in which the terminal device performs carrier sense at predetermined timing.

22 Claims, 18 Drawing Sheets

(56) References Cited

U.S. PATENT DOCUMENTS

| | | | |
|---|---|---|---|
| 2014/0023053 A1* | 1/2014 | Park | H04W 72/042 |
| | | | 370/336 |
| 2017/0318607 A1 | 11/2017 | Tiirola | |
| 2017/0373914 A1 | 12/2017 | Harada et al. | |
| 2018/0020375 A1 | 1/2018 | Matsumoto et al. | |
| 2018/0279366 A1 | 9/2018 | Harada et al. | |
| 2019/0335500 A1* | 10/2019 | Zhang | H04W 72/0446 |

FOREIGN PATENT DOCUMENTS

| | | |
|---|---|---|
| CN | 108141885 A | 6/2018 |
| EP | 3249963 A1 | 11/2017 |
| EP | 3355649 A1 | 8/2018 |
| WO | 2016/117608 A1 | 7/2016 |
| WO | 2016/148244 A1 | 9/2016 |
| WO | 2017/051723 A1 | 3/2017 |

OTHER PUBLICATIONS

"Study on NR-based Access to Unlicensed Spectrum," 3GPP TSG RAN Meeting 77, RP-172021, Sapporo, Japan, Sep. 11-14, 2017, 5 pages.

* cited by examiner

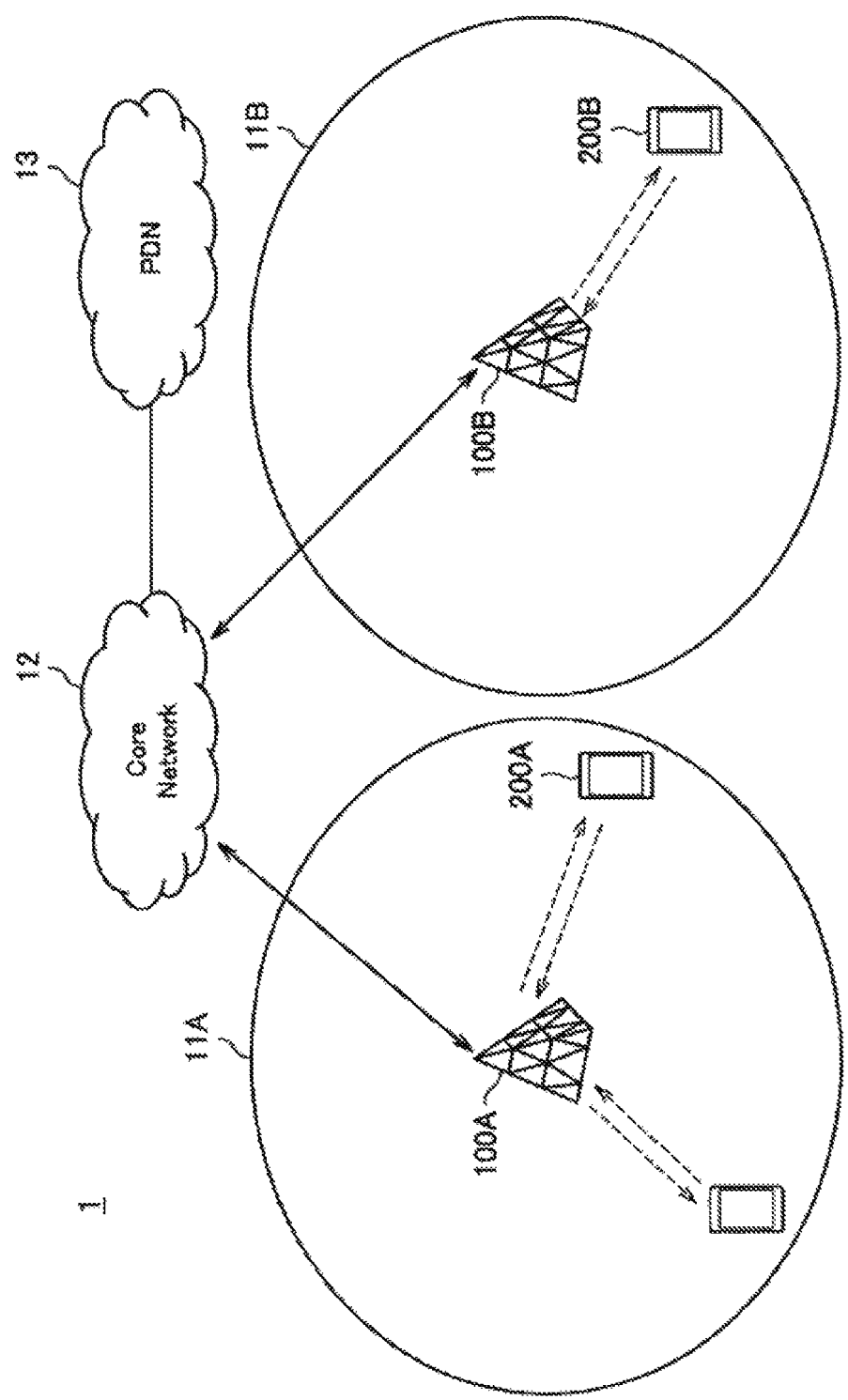
[FIG. 1]

[FIG. 2]
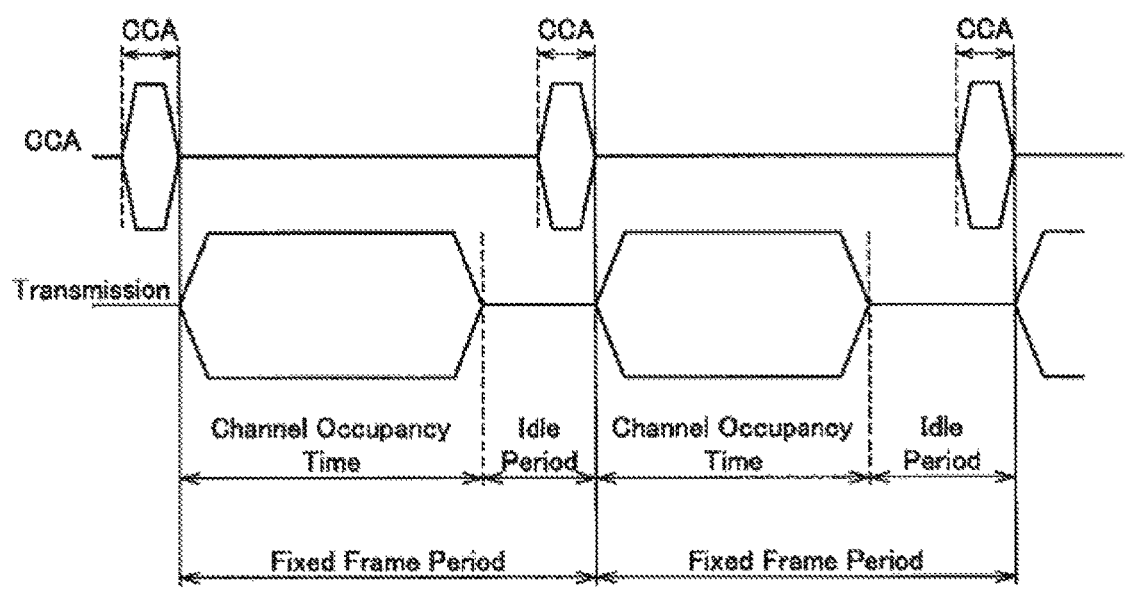

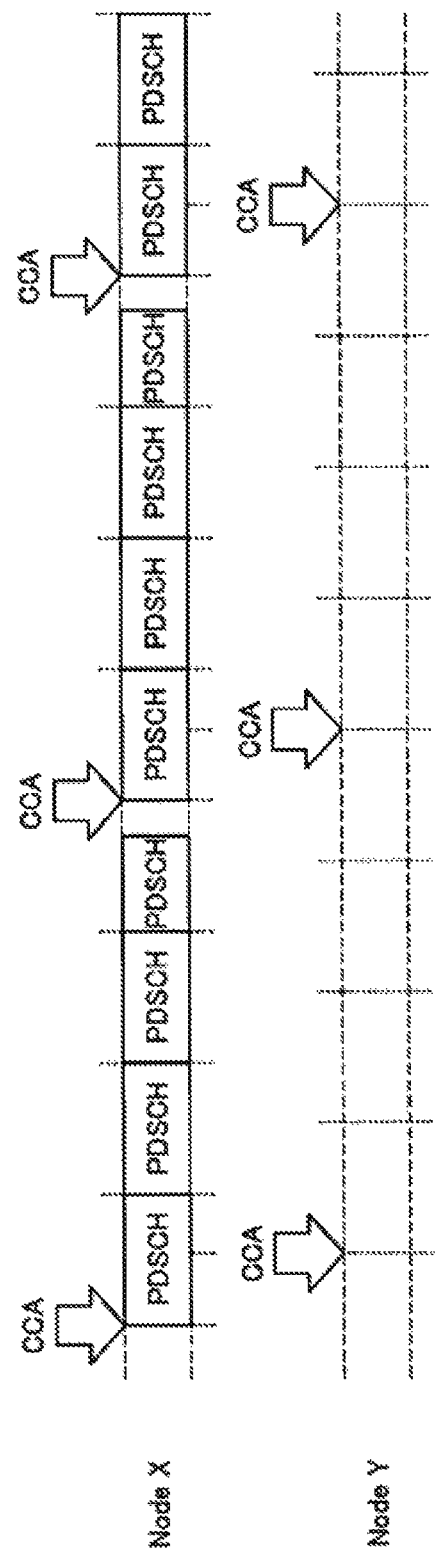
[FIG. 3]

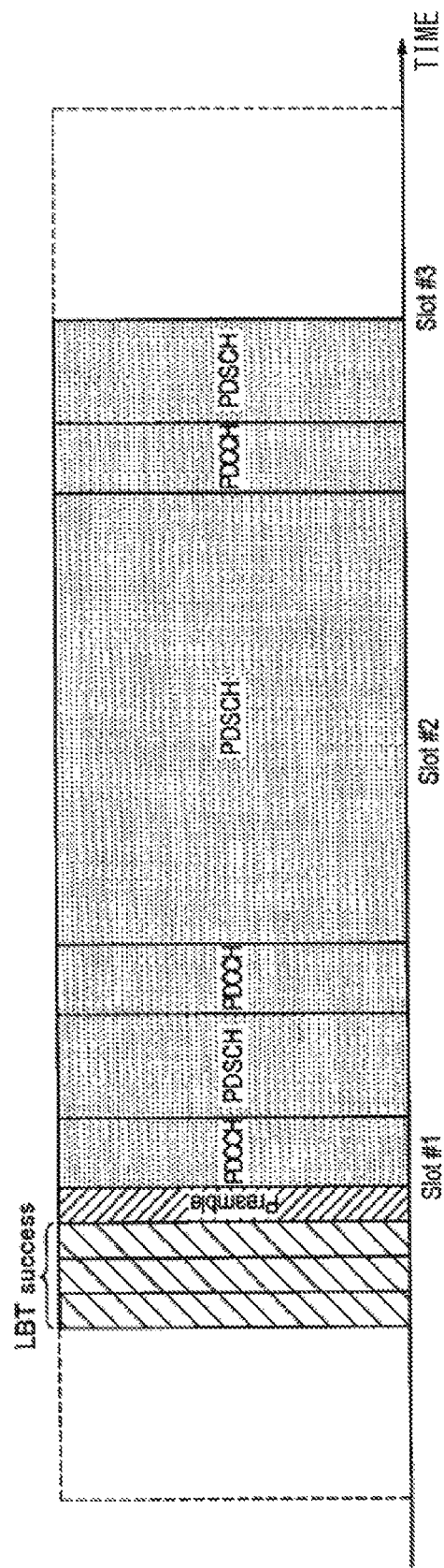
[FIG. 4]

[FIG. 5]
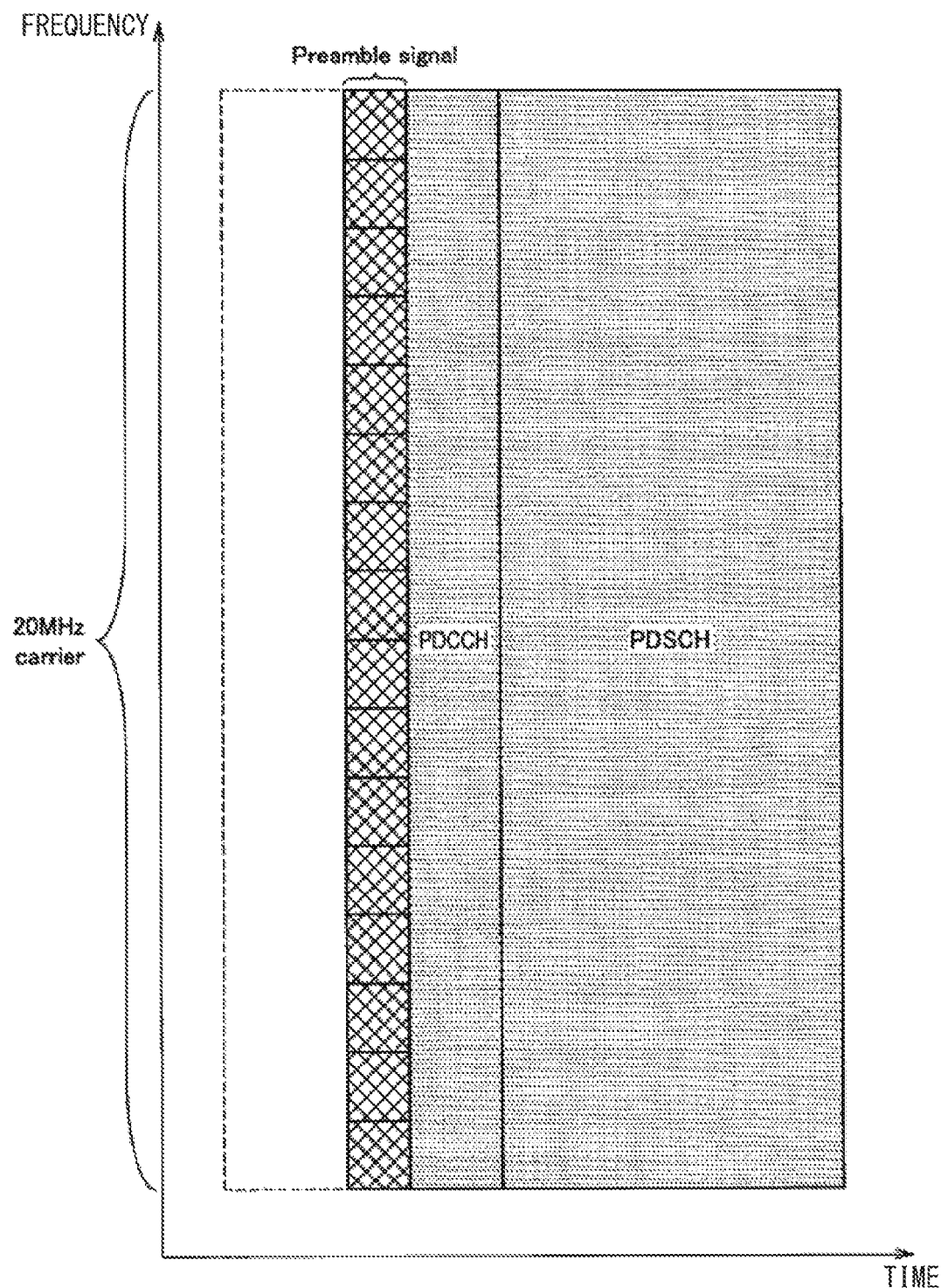

[FIG. 6]
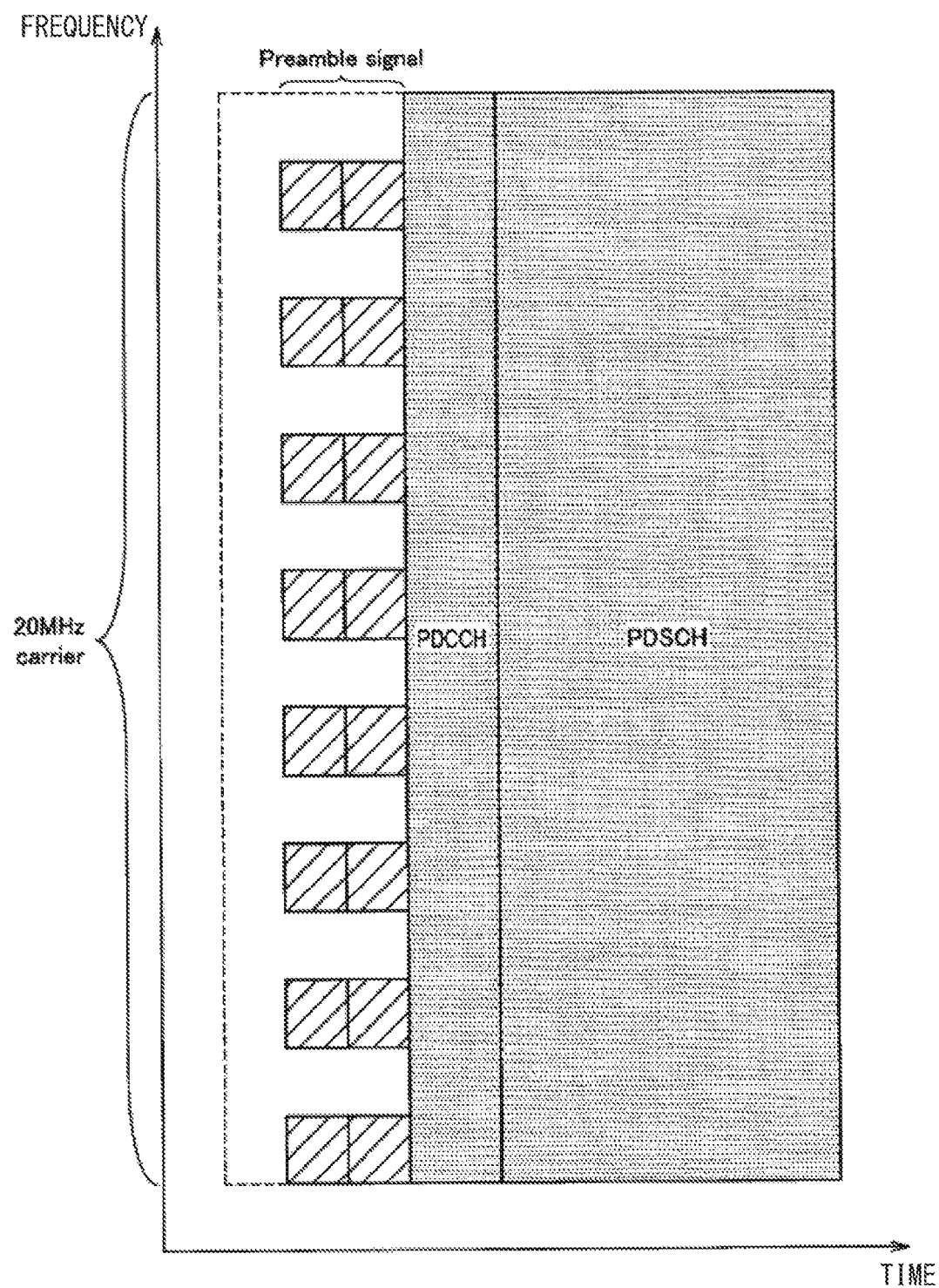

[FIG. 7]
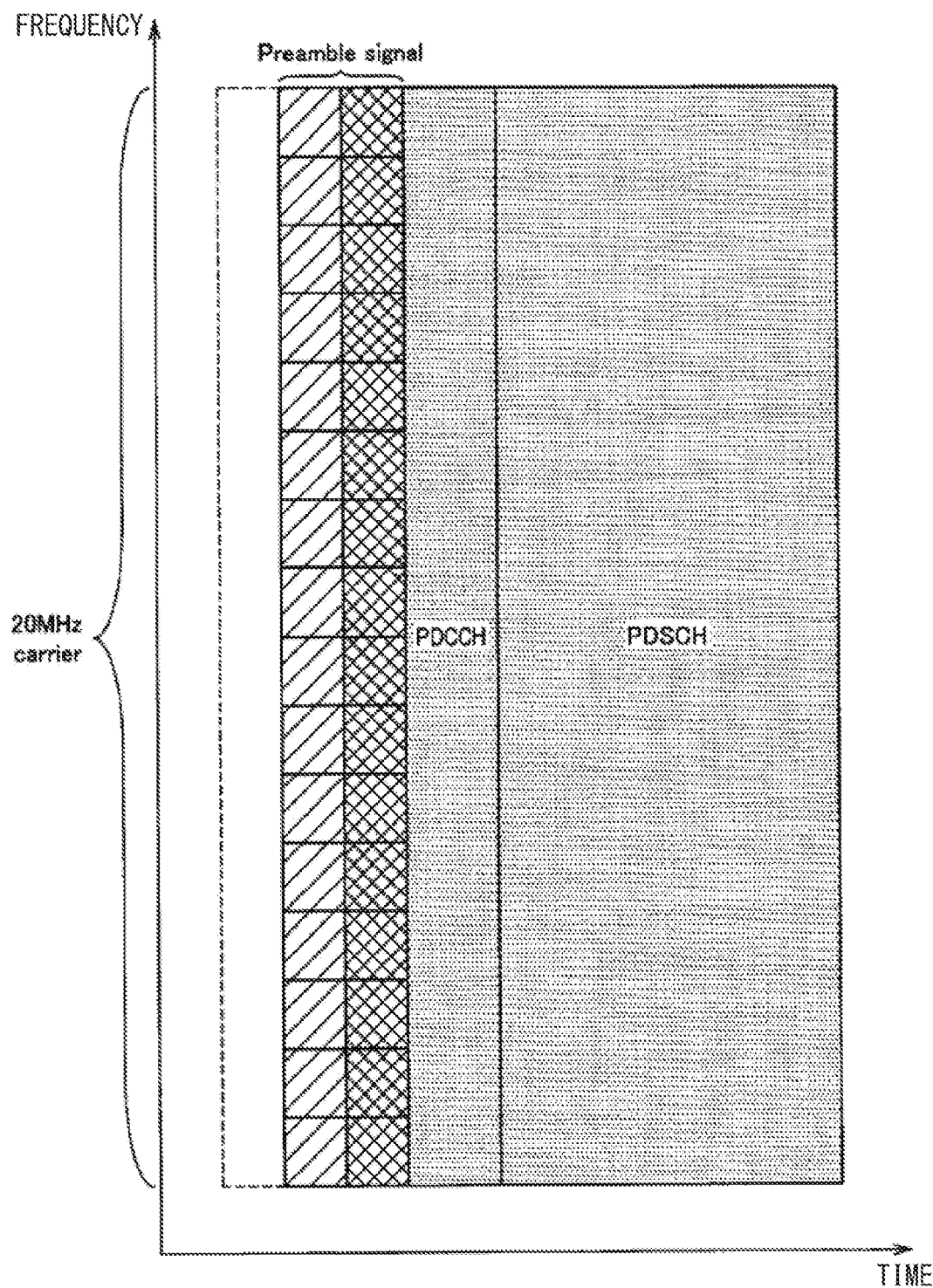

[FIG. 8]
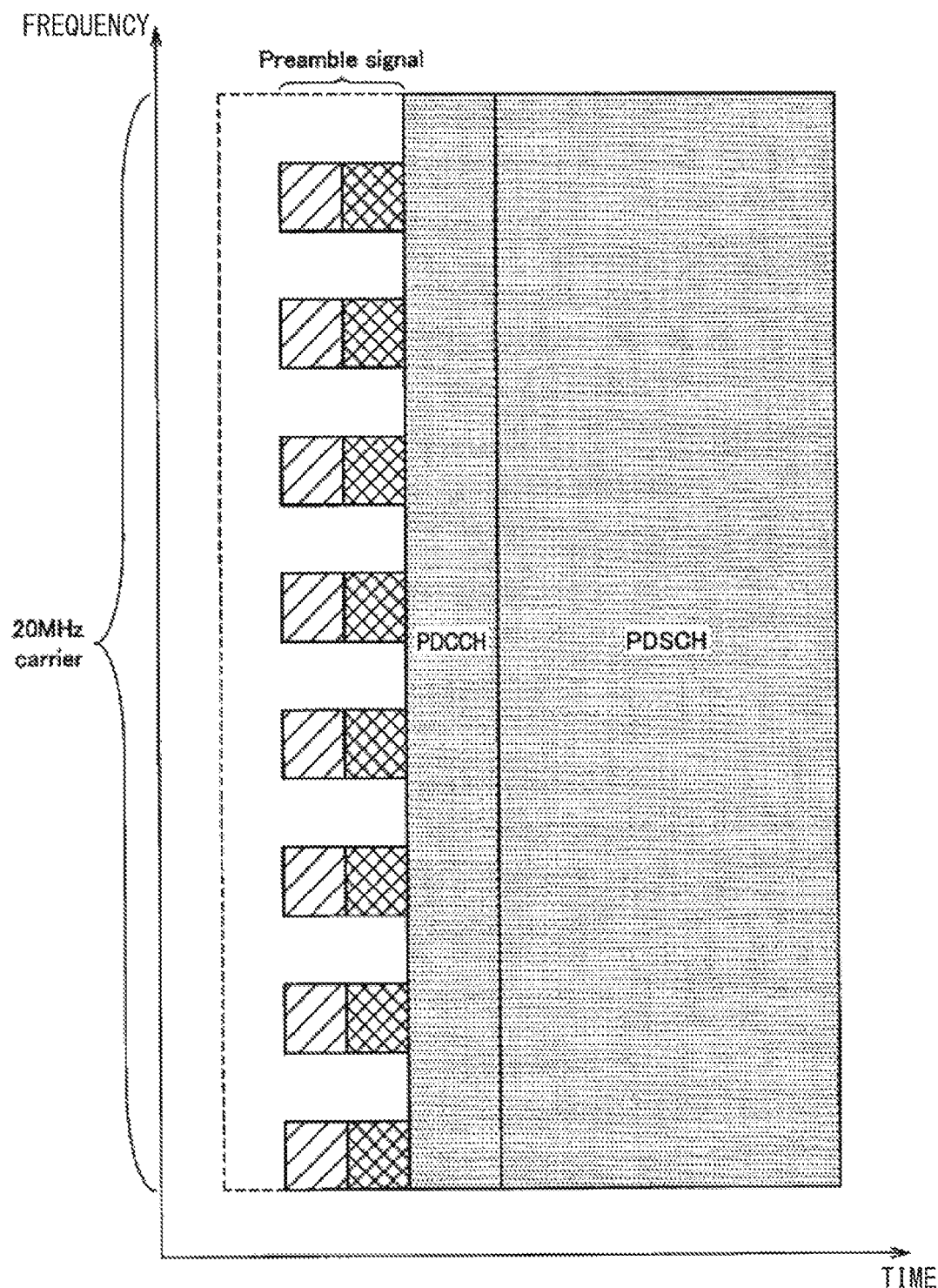

[FIG. 9]
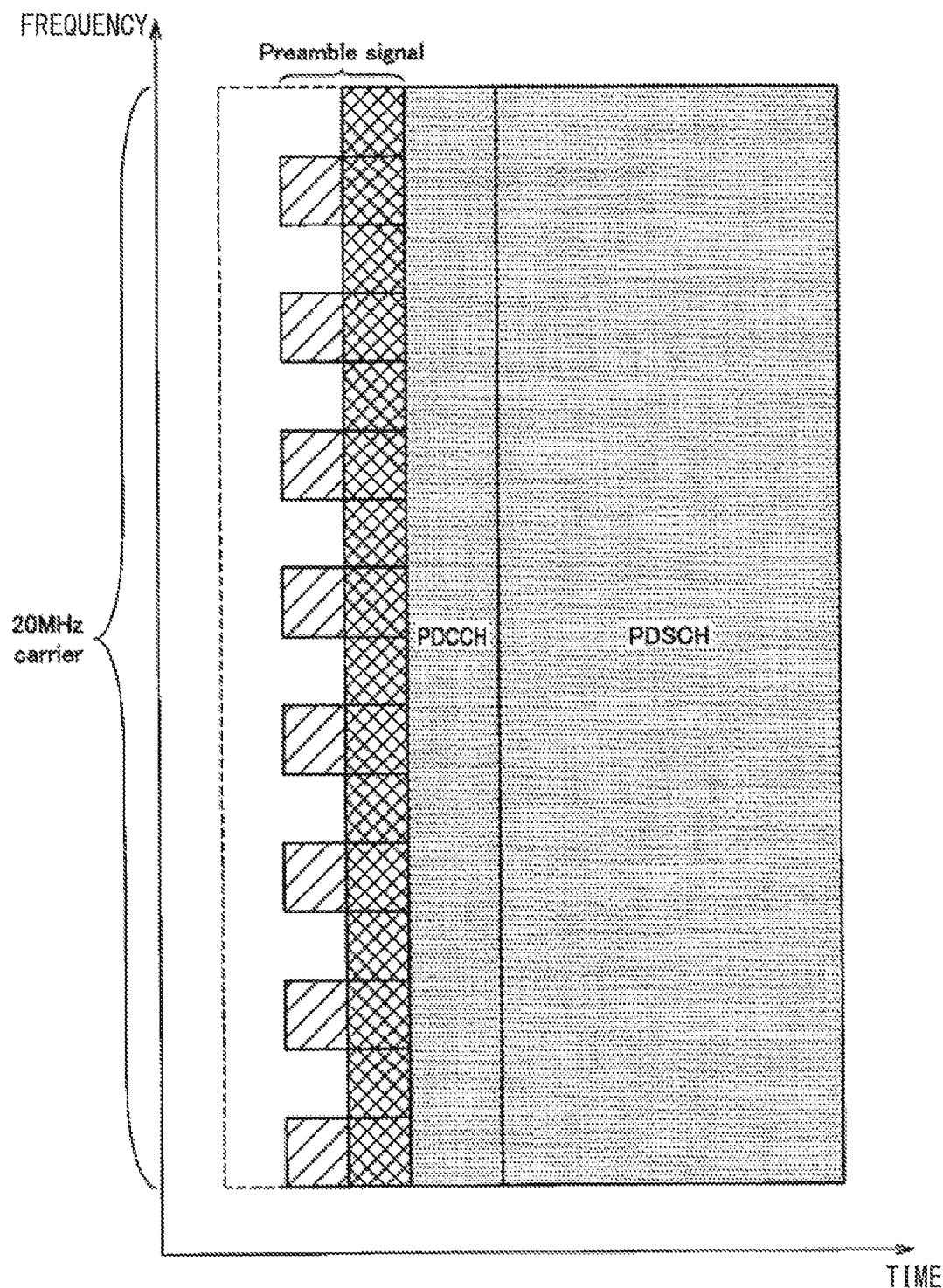

[FIG. 10]
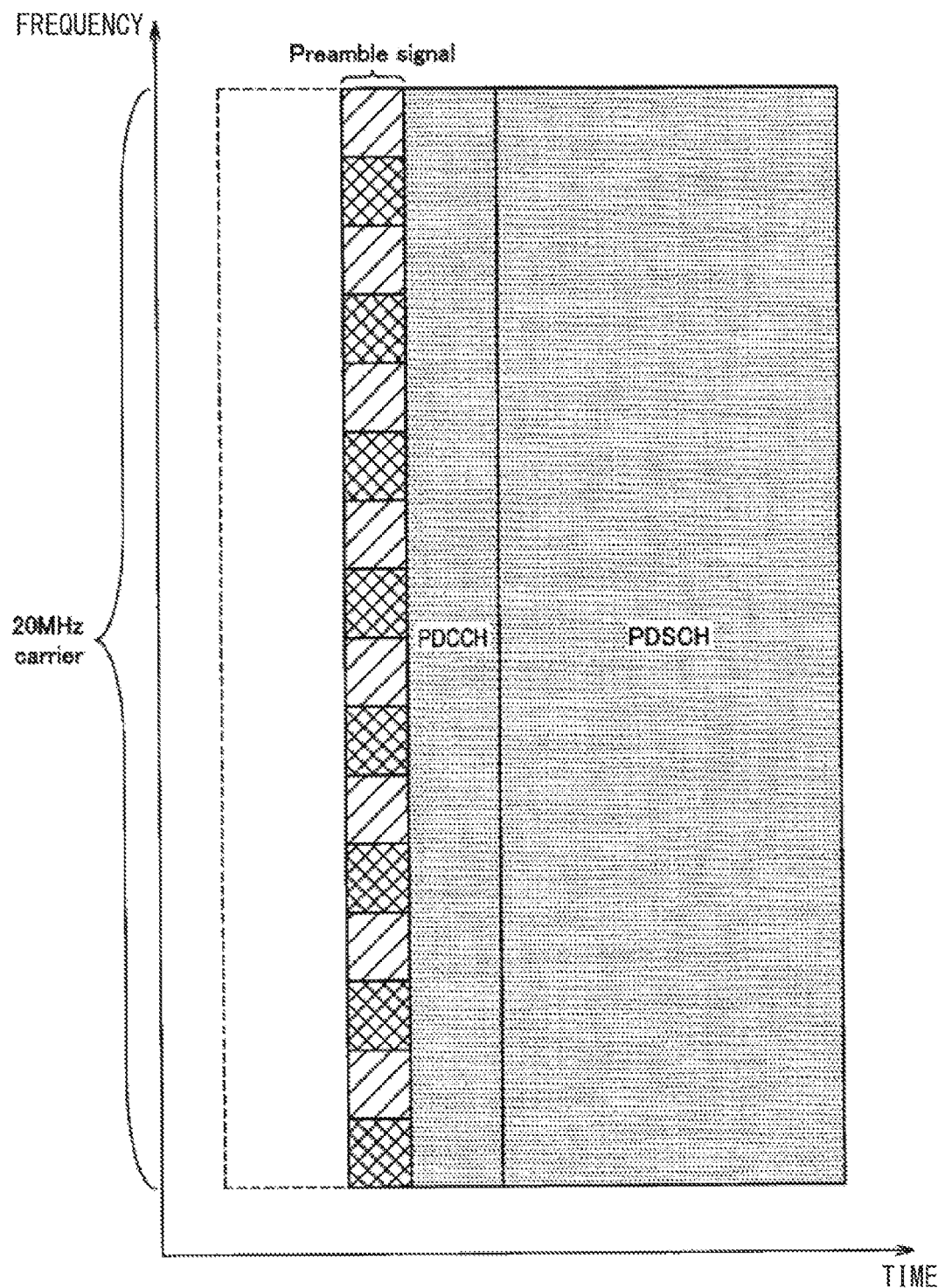

[FIG. 11]
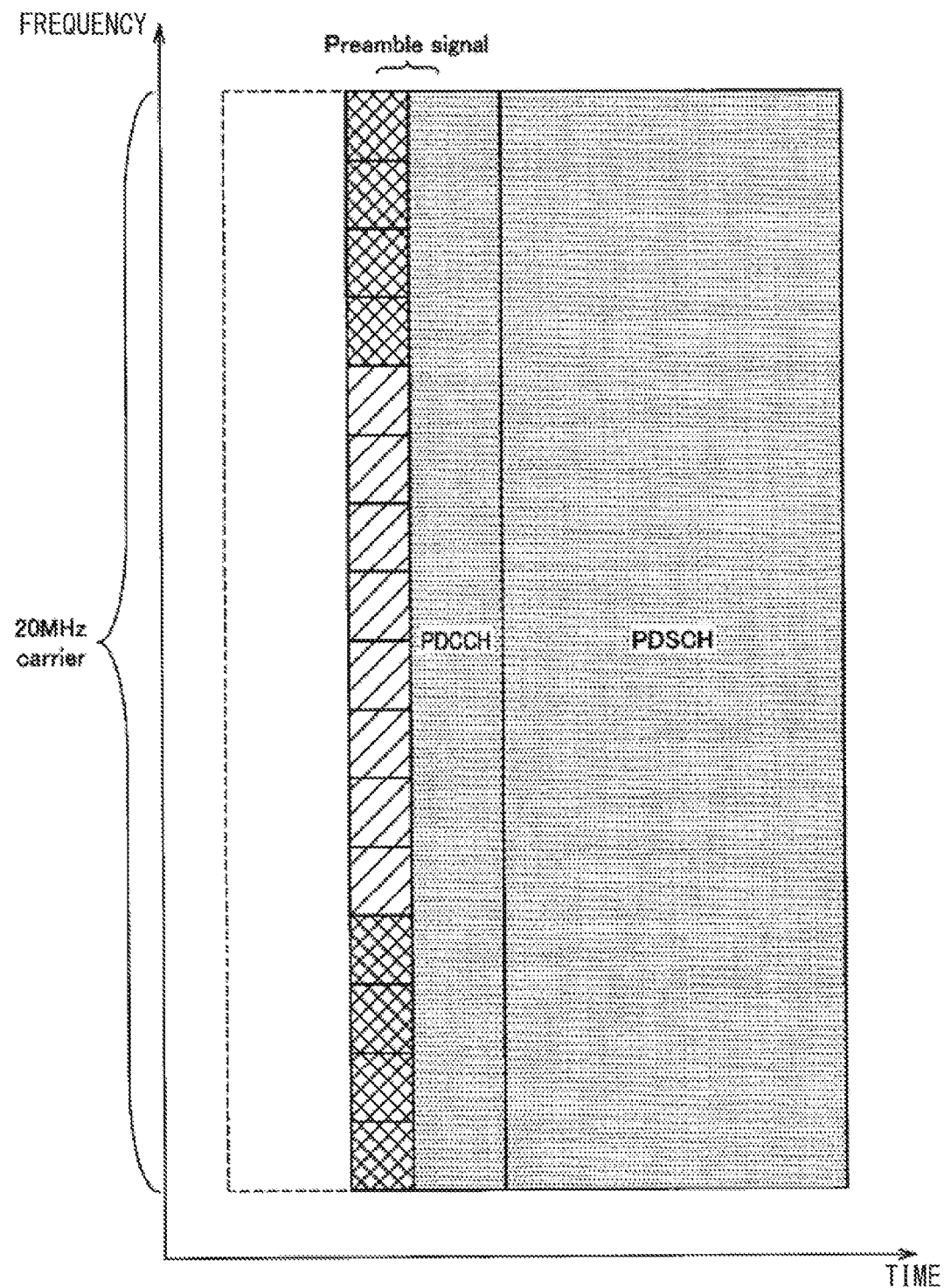

[FIG. 12]
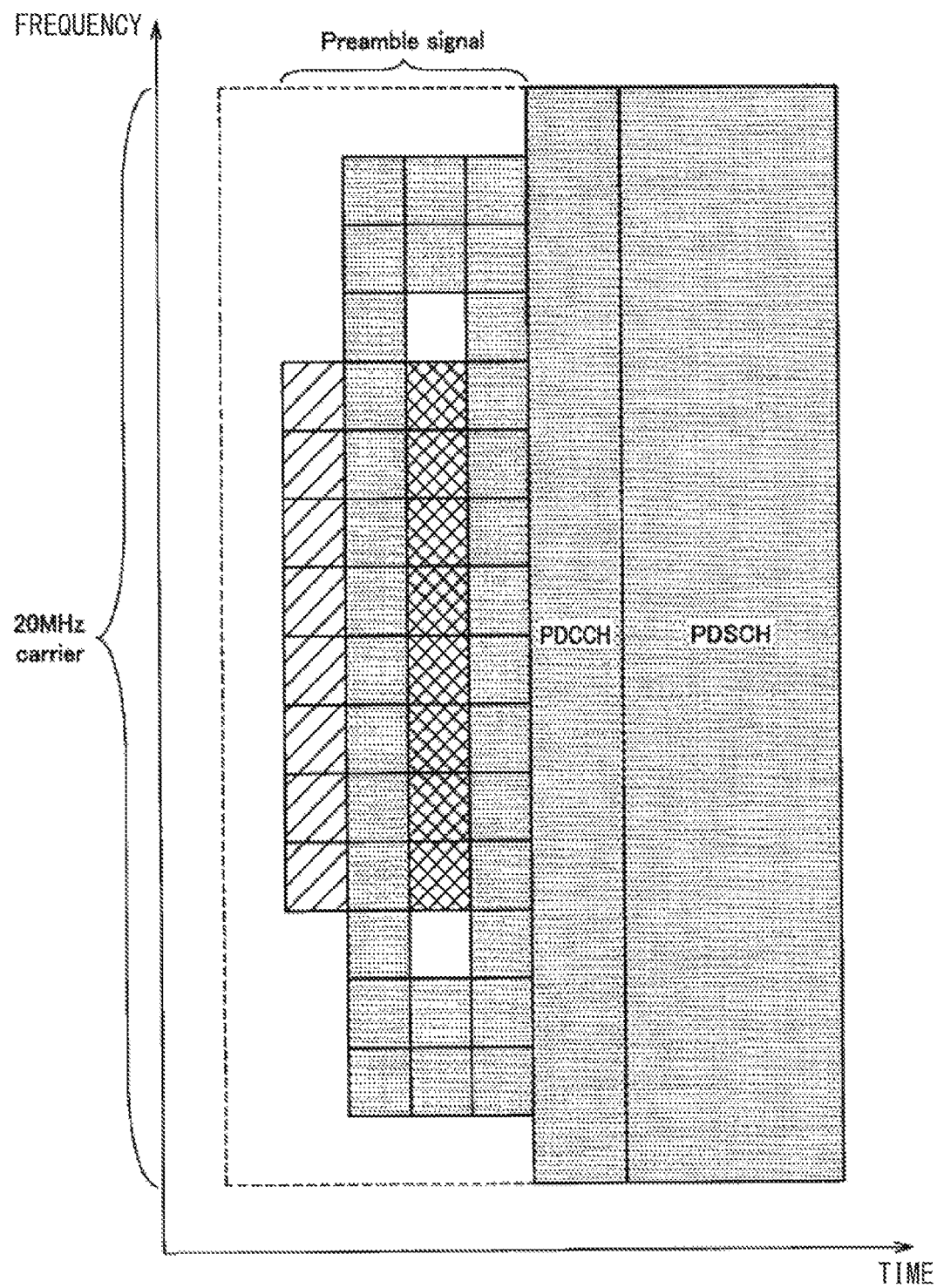

[FIG. 13]
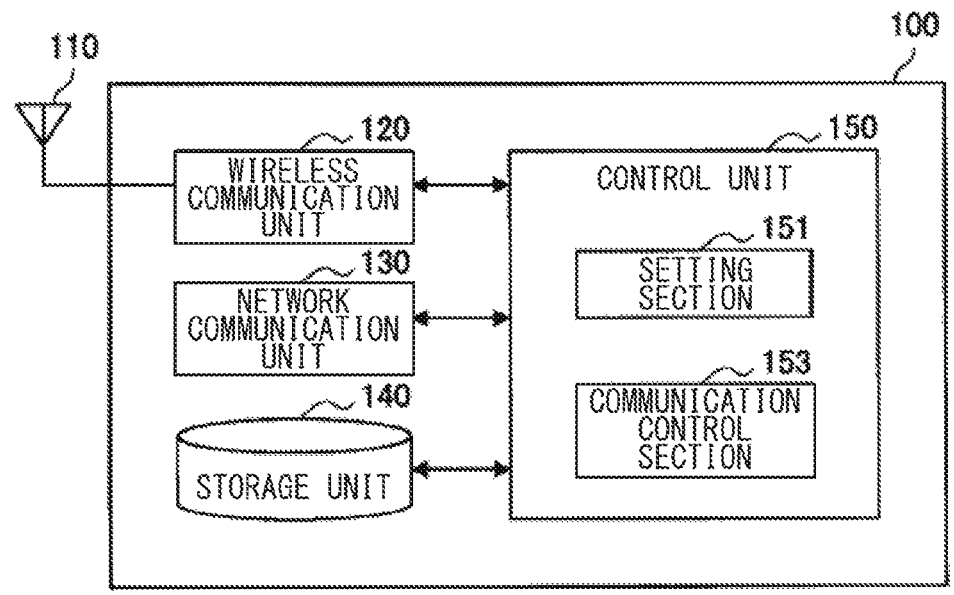
[FIG. 14]
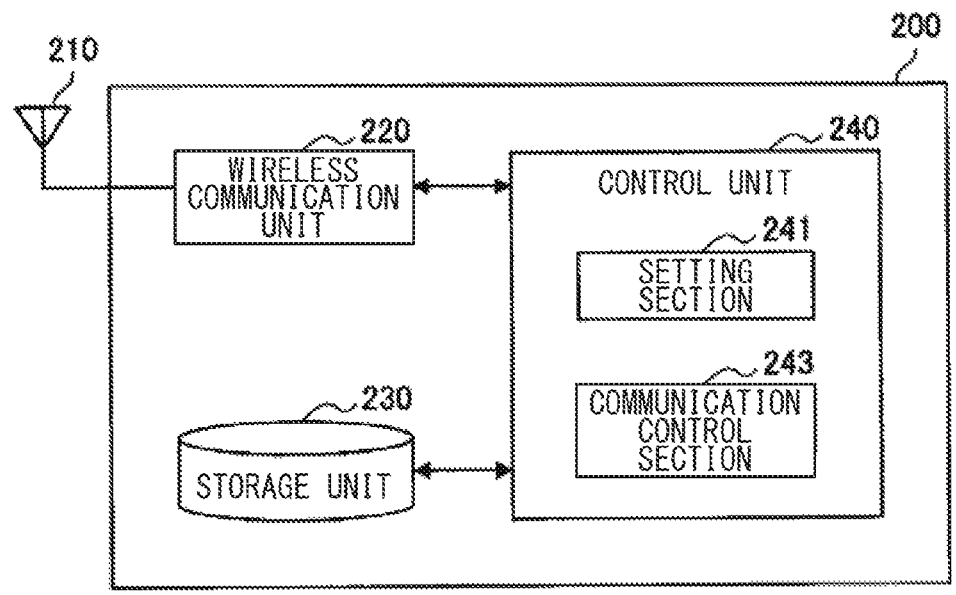

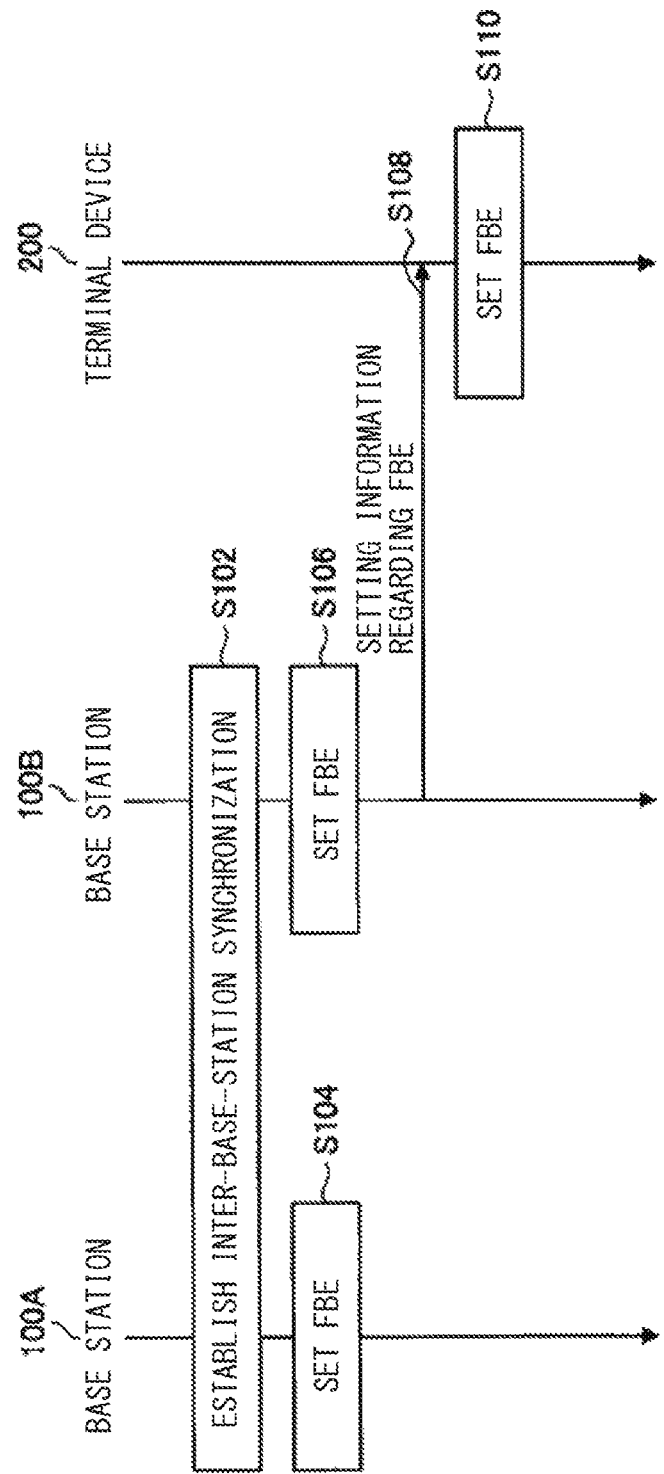
[FIG. 15]

[FIG. 16]
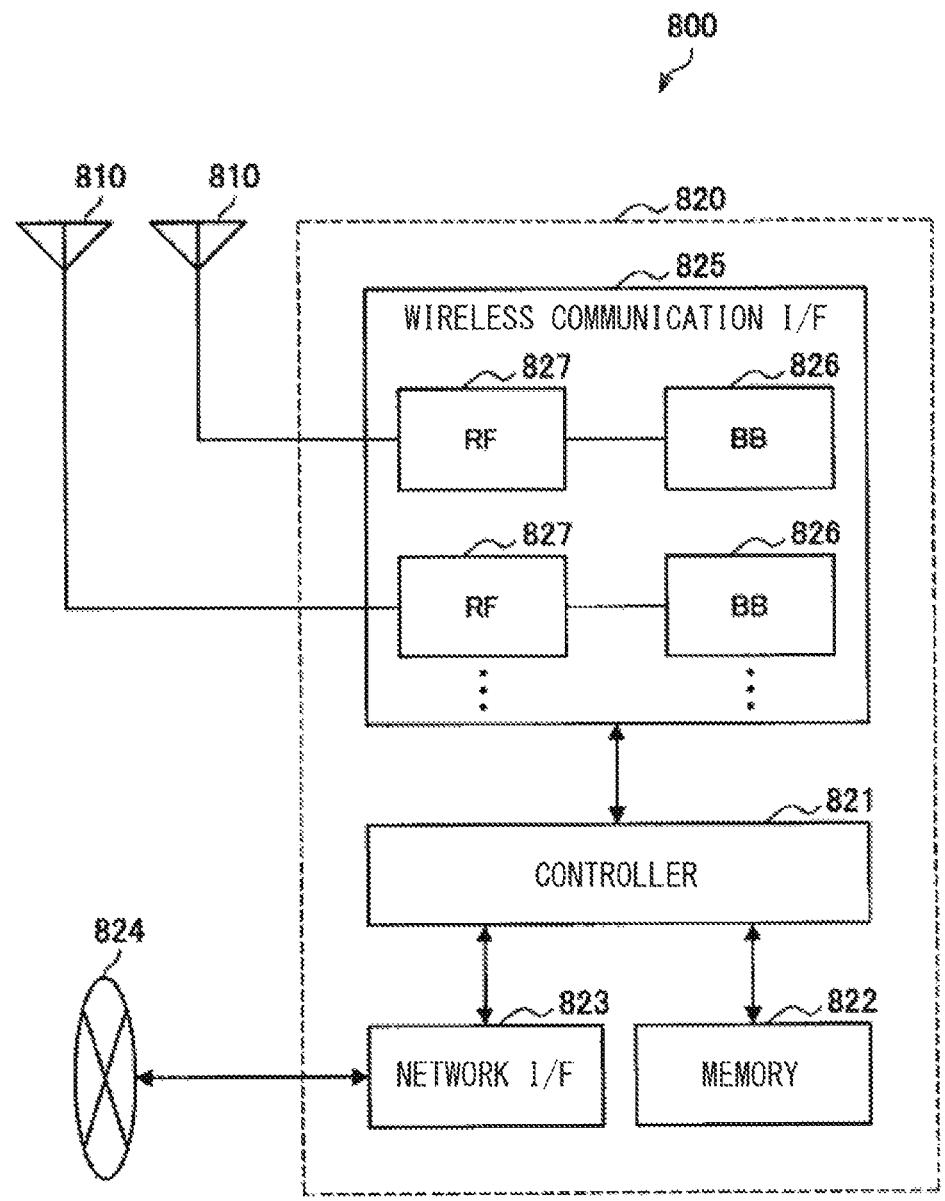

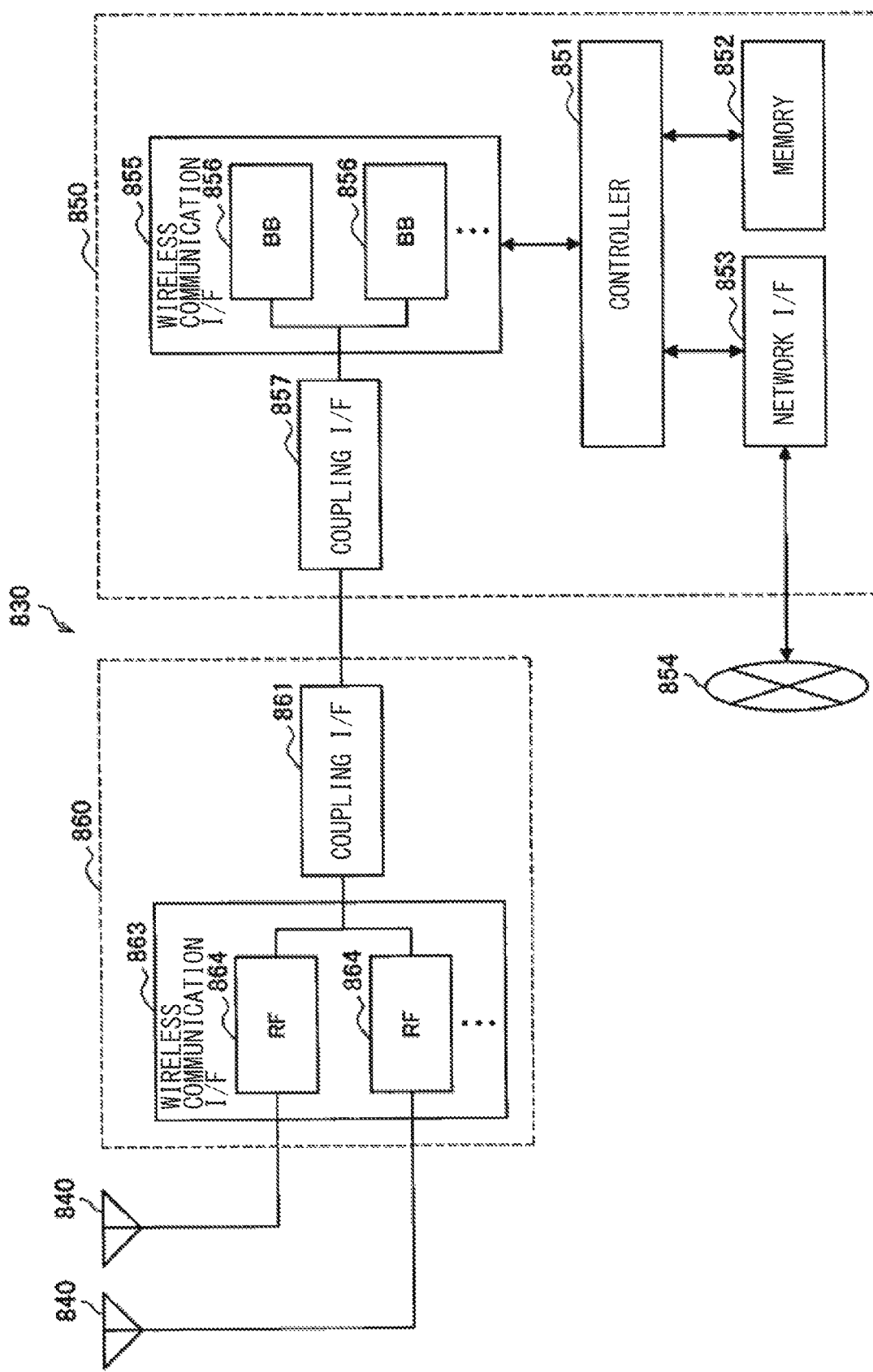
[FIG. 17]

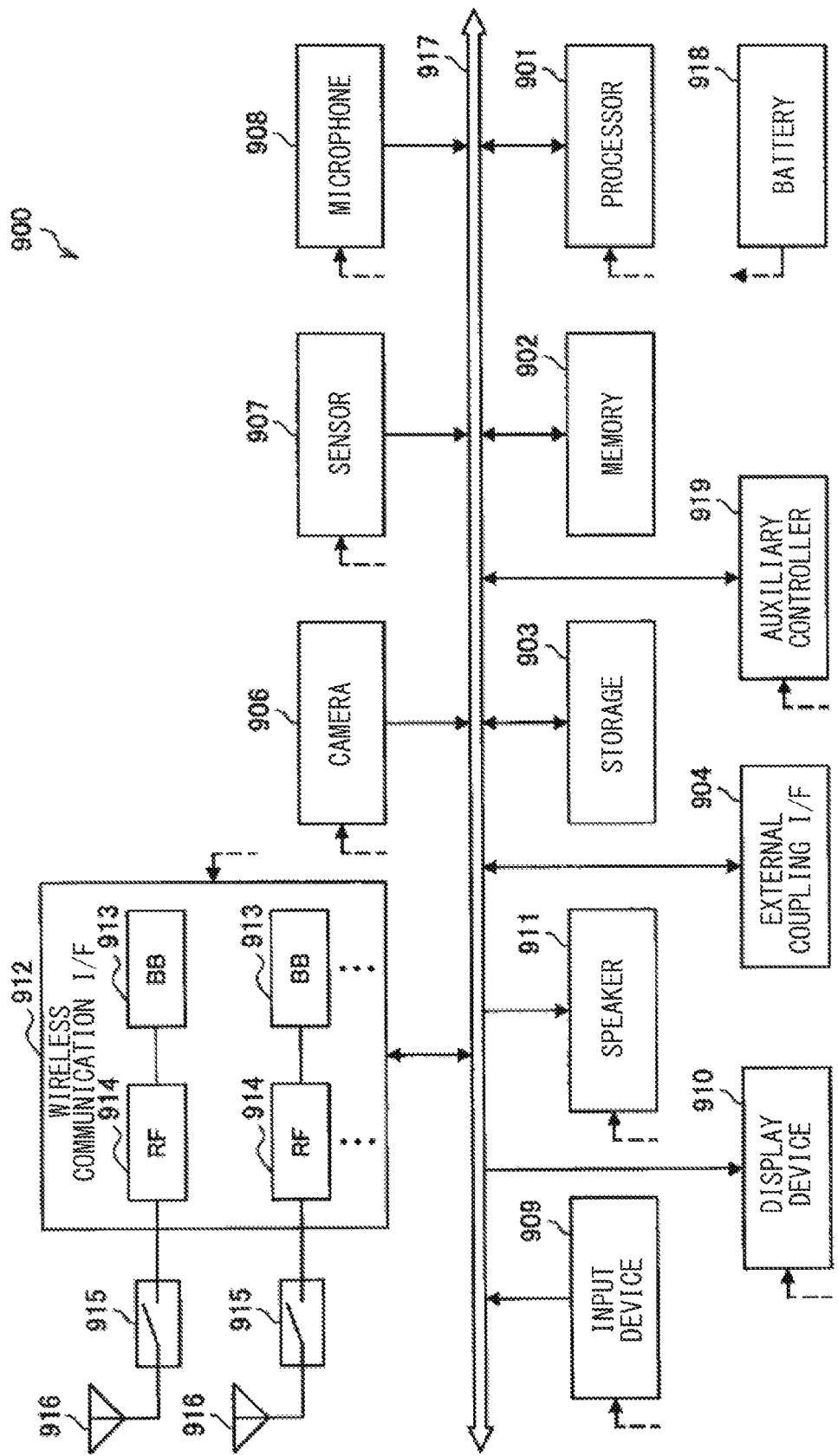

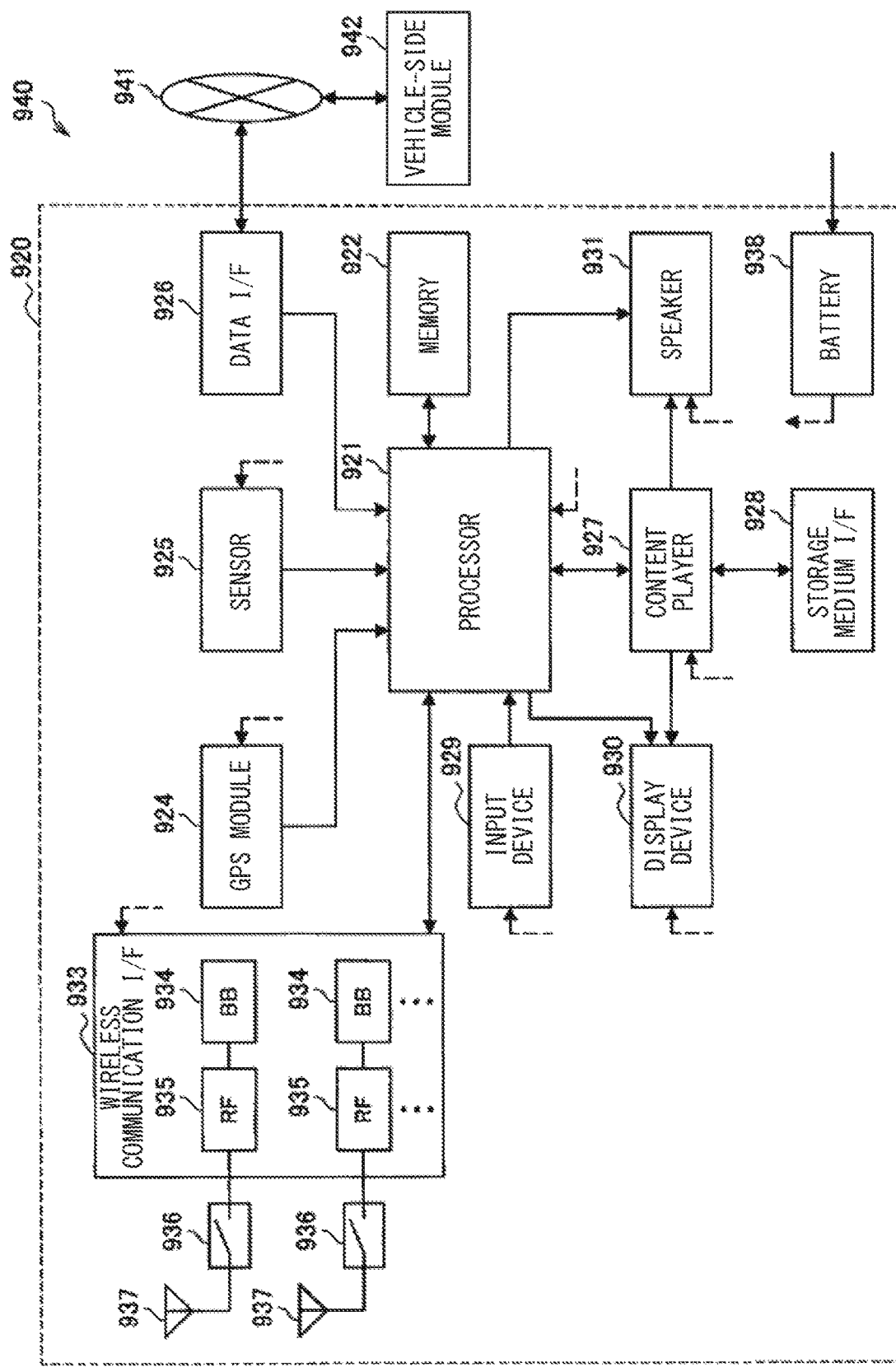
[FIG. 19]

BASE STATION, TERMINAL DEVICE, METHOD, AND APPARATUS

CROSS REFERENCE TO RELATED APPLICATIONS

This application is a U.S. National Phase of International Patent Application No. PCT/JP2019/041334 filed on Oct. 21, 2019, which claims priority benefit of Japanese Patent Application No. JP 2018-206703 filed in the Japan Patent Office on Nov. 1, 2018. Each of the above-referenced applications is hereby incorporated herein by reference in its entirety.

TECHNICAL FIELD

The present disclosure relates to a base station, a terminal device, a method, and a recording medium.

BACKGROUND ART

The third-generation partnership project (3rd Generation Partnership Project: 3GPP) studies wireless access schemes and wireless networks for cellular mobile communication (also referred to as "Long Term Evolution (LTE)", "LTE-Advanced (LTE-A)", "LTE-Advanced Pro (LTE-A Pro)", "New Radio (NR)", "New Radio Access Technology (NRAT)", "5G", "Evolved Universal Terrestrial Radio Access (EUTRA)", or "Further EUTRA (FEUTRA)" below). It is to be noted that LTE includes LTE-A, LTE-A Pro, and EUTRA and NR includes NRAT and FEUTRA in the following description. In LTE, a base station device (base station) is also referred to as eNodeB (evolved NodeB). In NR, a base station device (base station) is also referred to as gNodeB (gNB). In LTE and NR, a terminal device (a mobile station, a mobile station device, or a terminal) is also referred to as UE (User Equipment). LTE and NR are cellular communication systems in which the plurality of areas covered by base station devices is disposed as cells. A single base station device may manage a plurality of cells.

NR is RAT (Radio Access Technology) that differs from LTE as a next-generation wireless access scheme of LTE. NR is an access technology that is able to handle various use cases including eMBB (Enhanced Mobile broadband), mMTC (Massive machine type communications), and URLLC (Ultra reliable and low latency communications). NR is studied as a technical framework supporting use scenarios, request conditions, disposition scenarios, and the like in those use cases.

The operation of a wireless access scheme based on cellular communication in an unlicensed band (unlicensed band) and a license shared band (license shared band) is under consideration. The coexistence of other nodes or wireless systems is of importance in such an unlicensed band. Functions such as discontinuous transmission and LBT (Listen Before Talk) in which channels are sensed before transmission are requested from the wireless access schemes such as LTE and NR. NPTL 1 discloses the details of the wireless access scheme based on NR in an unlicensed band. It is to be noted that examples of the unlicensed band include a 2.4-GHz band, a 5-GHz band, and a 6-GHz band. Examples of the license shared band include a 3.5-GHz band and a 37-GHz band.

CITATION LIST

Non-Patent Literature

NPTL 1: RP-172021, "Study on NR-based Access to Unlicensed Spectrum," 3GPP TSG RAN Meeting #77, Sapporo, Japan, Sep. 11-14, 2017.

SUMMARY OF THE INVENTION

Problems to be Solved by the Invention

It is difficult in some cases to maintain fair channel access between various coexisting nodes in unlicensed band. As an example, it is difficult in some cases to maintain fair channel access between nodes that have different settings for carrier sense.

Accordingly, the present disclosure proposes a mechanism that makes it possible to achieve fair channel access between a plurality of nodes.

Means for Solving the Problems

According to the present disclosure, there is provided a base station including a control unit that notifies a terminal device of setting information regarding a channel access scheme to be used and carrier sense. The terminal device is configured to use, as channel access schemes, a first scheme in which the terminal device performs carrier sense at any timing and a second scheme in which the terminal device performs carrier sense at predetermined timing.

In addition, according to the present disclosure, there is provided a terminal device configured to use, as channel access schemes, a first scheme in which the terminal device performs carrier sense at any timing and a second scheme in which the terminal device performs carrier sense at predetermined timing. The terminal device includes a control unit that sets a channel access scheme to be used and makes a setting for carrier sense on the basis of setting information regarding a channel access scheme to be used and carrier sense. The terminal device is notified of the setting information by a base station.

In addition, according to the present disclosure, there is provided a method that is executed by a processor. The method includes notifying a terminal device of setting information regarding a channel access scheme to be used and carrier sense. The terminal device is configured to use, as channel access schemes, a first scheme in which the terminal device performs carrier sense at any timing and a second scheme in which the terminal device performs carrier sense at predetermined timing.

In addition, according to the present disclosure, there is provided a method that is executed by a terminal device. The terminal device is configured to use, as channel access schemes, a first scheme in which the terminal device performs carrier sense at any timing and a second scheme in which the terminal device performs carrier sense at predetermined timing. The method includes setting a channel access scheme to be used and making a setting for carrier sense on the basis of setting information regarding a channel access scheme to be used and carrier sense. The terminal device is notified of the setting information by a base station.

In addition, there is provided a recording medium having a program recorded thereon. The program causes a computer to function as a control unit that notifies a terminal device of setting information regarding a channel access scheme to be used and carrier sense. The terminal device is configured to use, as channel access schemes, a first scheme in which the terminal device performs carrier sense at any timing and a second scheme in which the terminal device performs carrier sense at predetermined timing.

In addition, according to the present disclosure, there is provided a recording medium having a program recorded thereon. The program causes a computer to function as a control unit. The computer controls a terminal device configured to use, as channel access schemes, a first scheme in which the terminal device performs carrier sense at any timing and a second scheme in which the terminal device performs carrier sense at predetermined timing. The control unit sets a channel access scheme to be used and makes a setting for carrier sense on the basis of setting information regarding a channel access scheme to be used and carrier sense. The terminal device is notified of the setting information by a base station.

BRIEF DESCRIPTION OF DRAWING

FIG. 1 is a diagram illustrating an overall configuration of a communication system according to an embodiment of the present disclosure.

FIG. 2 is a diagram for describing an overview of FBE.

FIG. 3 is a diagram for describing a technical problem of the present embodiment.

FIG. 4 is an explanatory diagram illustrating an example of a Preamble signal that accompanies a head of a downlink.

FIG. 5 is an explanatory diagram illustrating a configuration example of the Preamble signal.

FIG. 6 is an explanatory diagram illustrating a configuration example of the Preamble signal.

FIG. 7 is an explanatory diagram illustrating a configuration example of the Preamble signal.

FIG. 8 is an explanatory diagram illustrating a configuration example of the Preamble signal.

FIG. 9 is an explanatory diagram illustrating a configuration example of the Preamble signal.

FIG. 10 is an explanatory diagram illustrating a configuration example of the Preamble signal.

FIG. 11 is an explanatory diagram illustrating a configuration example of the Preamble signal.

FIG. 12 is an explanatory diagram illustrating a configuration example of the Preamble signal.

FIG. 13 is a block diagram illustrating an example of a configuration of a base station according to the present embodiment.

FIG. 14 is a block diagram illustrating an example of a configuration of a terminal device according to the present embodiment.

FIG. 15 is a sequence diagram illustrating an example of a flow of a communication control process executed by the communication system according to the present embodiment.

FIG. 16 is a block diagram illustrating a first example of a schematic configuration of eNB.

FIG. 17 is a block diagram illustrating a second example of the schematic configuration of the eNB.

FIG. 18 is a block diagram illustrating an example of a schematic configuration of a smartphone.

FIG. 19 is a block diagram illustrating an example of a schematic configuration of a car navigation apparatus.

MODES FOR CARRYING OUT THE INVENTION

The following describes a preferred embodiment of the present disclosure in detail with reference to the accompanying drawings. It is to be noted that, in this description and the drawings, components that have substantially the same functional configuration are indicated by the same signs and redundant description thereof is thus omitted.

In addition, in this specification and the drawings, there are some cases in which elements having substantially the same functional configuration are distinguished by adding different letters after the same sign. For example, a plurality of elements having substantially the same functional configuration are distinguished, like base stations 100A and 100B, if necessary. However, in a case where it is not necessary to particularly distinguish a plurality of elements having substantially the same functional configuration, only the same sign is attached. For example, in a case where it is not necessary to particularly distinguish the base stations 100A and 100B, the base stations 100A and 100B are referred to simply as base stations 100.

It is to be noted that description is given in the following order.

1. Introduction
2. Configuration Examples of Respective Devices
3. Technical Features
4. Application Examples
5. Conclusion 1. Introduction 1.1. System Configuration Example FIG. 1 is a diagram illustrating an overall configuration of a communication system according to an embodiment of the present disclosure. As illustrated in FIG. 1, a communication system 1 includes a plurality of base stations 100 (100A and 100B), a plurality of terminal devices 200 (200A and 200B), a core network 12, and PDN (Packet Data Network) 13.

Each of the base stations 100 is a communication device that operates a cell 11 and provides a wireless communication service to the one or more terminal devices 200 positioned inside the cell 11. The cell 11 is operated, for example, in conformity with any wireless communication scheme such as LTE or NR. The base station 100 is coupled to the core network 12. The core network 12 is coupled to the packet data network (PDN) 13 via a gateway device (not illustrated).

The core network 12 may include MME (Mobility Management Entity), S-GW (Serving gateway), P-GW (PDN gateway), PCRF (Policy and Charging Rule Function), and HSS (Home Subscriber Server). Alternatively, the core network 12 may include an entity of NR having a function similar to functions of them. The MME is a control node that handles a signal of a control plane. The MME manages the movement state of a terminal device. The S-GW is a control node that handles a signal of a user plane. The S-GW is a gateway device that switches transfer paths of user data. The P-GW is a control node that handles a signal of a user plane. The P-GW is a gateway device that serves as a coupling point between the core network 12 and the PDN 13. The PCRF is a control node that performs control regarding the policy and charging for the QoS (Quality of Service) or the like of a bearer. The HSS is a control node that handles subscriber data and performs service control.

The terminal device 200 is a communication device that performs wireless communication with the base station 100 on the basis of control performed by the base station 100. For example, the terminal device 200 measures a downlink signal from the base station 100 and reports measurement information indicating a measurement result to the base station 100. The base station 100 controls wireless communication with the terminal device 200 on the basis of the reported measurement information (also referred to as measurement report in some cases below). In contrast, the terminal device 200 may transmit an uplink signal for measurement to the base station 100. In this case, the base station 100 measures an uplink signal from the terminal device 200 and controls the wireless communication with the terminal device 200 on the basis of the measurement information. The measurement using an uplink signal requests no report in measurement using a downlink signal. It is thus possible to obtain measurement information more quickly. Therefore, for example, in a case where the terminal device 200 moves at high speed, it is preferable to perform measurement using an uplink signal.

The use of an X2 interface allows the base stations 100 to transmit and receive information to and from each other. For example, the base station 100 transmits measurement information regarding the terminal device 200 predicted to be handed over to another adjacent base station 100. This achieves stable handover. The terminal device 200 are secured the stability of wireless communication.

It is to be noted that there may be a communication device around the communication system 1 though not illustrated in FIG. 1. The communication device provides a wireless communication service operated by RAT other than cellular communication such as Wi-Fi (registered trademark) or MulteFire. The communication device is typically coupled to the PDN 13. It is to be noted that the base station 100, the terminal device 200, and a communication device operated by another RAT are also referred to generically as nodes below.

1.2. Scheme of Carrier Access

It is assumed that NR-U (unlicensed) supports a variety of use cases in addition to LAA (Licensed Assisted Access) that uses the mechanism of carrier aggregation. Examples of the use cases include dual connectivity (Dual Connectivity) and stand-alone (Stand-alone) in which an unlicensed band alone is used for operation. In addition, examples of the use cases also include operating any one of a DL carrier (downlink) and an UL (uplink) carrier in a licensed band and operating the other in an unlicensed band. In that case, for example, a DL carrier is operated in a licensed band and an UL carrier is operated in an unlicensed band.

For NR-U, ETSI BRAN defines the two channel access schemes of LBE (Load-based equipment) and FBE (Frame-based equipment).

LBE

LBE is a channel access scheme (corresponding to a first scheme) for performing carrier sense at any timing. It is to be noted that carrier sense is a concept including LBT (Listen Before Talk), CSMA/CA (Carrier Sense Multiple Accesses with Collision Avoidance), and CCA (Channel Clear Assessment).

LBE is a scheme adopted by Wi-Fi or the like. In the scheme, the channel is accessed with an operation similar to an operation in CSMA/CA. A node that performs LBE performs CCA a plurality of times by random backoff. In a case where the channels are clear in all CCA slots, transmission is possible.

The channel access of LTE LAA is LBE. NR-U is also expected to have LBE-based channel access introduced thereto. Meanwhile, in addition to LBE, the introduction of FBE to NR-U is under consideration.

FBE

FBE is a channel access scheme (corresponding to a second scheme) for performing carrier sense at predetermined timing. In FBE, a frame is defined and CCA is performed in units of frames. The following describes an overview of FBE with reference to FIG. 2.

FIG. 2 is a diagram for describing an overview of FBE. The upper part of FIG. 2 illustrates the timing of CCA with the horizontal axis as a time axis. The lower part of FIG. 2 illustrates the timing of transmission with the horizontal axis as a time axis. As illustrated in FIG. 2, a fixed frame period (Fixed Frame Period) is defined in FBE and CCA is performed only one time immediately before the fixed frame period. In a case where the channel is clear, transmission is possible. In a case where the channel is busy, no transmission is performed before the next fixed frame period. In a case where transmission is possible, transmission is performed during a channel occupancy time (Channel Occupancy Time) and transmission is stopped in an idle period (Idle Period).

CCA is performed once per transmission in FBE. This allows channel access to have less latency. In addition, setting a short fixed frame period allows FBE to be applied to a use case of low latency communication.

Different Points Between LBE and FBE

It is a first different point between LBE and FBE how many times CCA is performed. CCA is performed one or more times in LBE before transmission. In contrast, CCA is performed one time in FBE before transmission.

It is a second different point between LBE and FBE whether or not a frame is defined. No fixed frame period is defined in LBE for channel access. In contrast, a fixed frame period is defined in FBE for channel access. Further, no idle period is not defined in LBE. In contrast, an idle period is defined in FBE. The idle period is defined in the fixed frame period. It is to be noted that it is possible to define a frame different from a frame for channel access such as frames (e.g., radio frame and slot) for synchronization and scheduling units in both LBE and FBE.

The timing of CCA is a third different point between LBE and FBE. CCA is performed at any timing in FBE. In contrast, CCA is performed at the fixed timing immediately before a fixed frame period in LBE.

The presence or absence of a contention window (Contention Window) is a fourth different point between LBE and FBE. CCA is performed one or more times in LBE and a contention window is therefore set. In contrast, no contention window is set in FBE. Further, a priority class (Priority Class) is set in LBE. In contrast, no priority class has to be set in FBE. The priority class is used to set a contention window.

1.3. Technical Problems

FIG. 3 is a diagram for describing a technical problem of the present embodiment. The upper part of FIG. 3 illustrates communication performed by a node X that uses FBE with the horizontal axis as a time axis. The lower part of FIG. 3 illustrates communication performed by a node Y that uses FBE with the horizontal axis as a time axis. In the example illustrated in FIG. 3, the node X and the node Y are out of synchronization. Thus, the node X always performs transmission at the timing at which the node Y performs CCA. The node Y is unable to perform transmission for a long period. Examples in which the node X and the node Y are out of synchronization include a case where the node X and the node Y are operated by different operators or operated by different RATs. As illustrated in FIG. 3, there are sometimes unfair transmission opportunities even between a plurality of nodes that both uses FBE.

In addition, in a case where FBE and LBE coexist, FBE has less timing for channel access than that of LBE. This may cause FBE to excessively more transmission opportunities than those of LBE. Meanwhile, some (fixed frame period, channel occupancy time, and idle period setting) of the settings for carrier sense in FBE may cause LBE to acquire excessively more transmission opportunities than those of FBE.

In this way, it is difficult in some cases to achieve fair channel access between a plurality of nodes.

Overview of Proposed Technology

Accordingly, the present disclosure proposes a mechanism that makes it possible to achieve fair channel access between a plurality of nodes. The proposed technology switches LBE and FBE to be used as a channel access scheme between the base station 100 and the terminal device 200. Further, the proposed technology flexibly makes a setting for carrier sense in the channel access scheme used by the base station 100 and the terminal device 200. The proposed technology is able to suppress the occurrence of unfair transmission opportunities and achieve fair channel access by flexibly setting a channel access scheme and flexibly making a setting for carrier sense.

1.4. Related Technology

<Channel Access Procedure of Unlicensed Channel>

A channel access (Channel access or Listen before Talk) procedure is performed to access an unlicensed channel for transmission in a base station device or a terminal device.

In the channel access procedure defined as load-based equipment (LBE: Load-Based Equipment), a channel is sensed (sensing) one time or a plurality of times. On the basis of a result of the sensing, a determination (vacancy determination) is made as to whether the channel is idle (idle, unoccupied, available, or enable) or busy (busy, occupied, unavailable, or disable). In sensing a channel, the power of the channel for a predetermined waiting time is sensed (sense).

Examples of the waiting time of the channel access procedure include a first waiting time (slot), a second waiting time, and a third waiting time (defer period), and a fourth waiting time.

The slot (slot) is a waiting time unit of a base station device and a terminal device in the channel access procedure. The slot is defined, for example, as 9 microseconds.

In the second waiting time, one slot is inserted at the head. The second waiting time is defined, for example, as 16 microseconds.

The defer period (defer period) includes the second waiting time and a plurality of consecutive slots subsequent to the second waiting time. The number of the plurality of consecutive slots subsequent to the second waiting time is determined on the basis of a priority class (priority class or channel access priority class) used to satisfy QoS.

The fourth waiting time includes the second waiting time and one slot subsequent to the second waiting time.

A base station device or a terminal device senses (sense) a predetermined channel in the period of a predetermined slot. In a case where the power detected by the base station device or the terminal device for at least 4 microseconds within the predetermined slot period is less than a predetermined power detection threshold, the predetermined slot is considered idle (idle). In contrast, in a case where the power is greater than the predetermined power detection threshold, the predetermined slot is considered busy (busy).

The channel access procedure includes a first channel access procedure and a second channel access procedure. The first channel access procedure, the first channel access procedure is performed by using a plurality of slots and a defer period. The second channel access procedure is performed by using one fourth waiting time.

A parameter regarding channel access is determined on the basis of a priority class. Examples of the parameter regarding channel access include a minimum contention window, a maximum contention window, a maximum channel occupancy time, a value that the contention window may have, and the like. A priority class is defined by the value of QCI (QoS class identifier) for processing QoS (Quality of Service). Table 1 indicates a relationship table between a priority class and a parameter regarding channel access and Table 2 indicates an example of mapping between a priority class and QCI.

TABLE 1

Example of relationship table between priority class and parameter regarding channel access

| channel access priority class (P) | $m_p$ | minimum contention window $CW_{min,p}$ | maximum contention window $CW_{max,p}$ | maximum channel occupancy time $T_{mcot,p}$ | value that contention window $CW_p$ may have |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

Example of mapping between priority class and QCI

| channel access priority class | QCI |
|---|---|
| 1 | 1, 3, 5, 65, 66, 69, 70 |
| 2 | 2, 7 |
| 3 | 4, 6, 8, 9 |
| 4 | other than what have been described above |

<Details of First Channel Access Procedure>

In the first channel access procedure, the steps described below are performed.

(0) A channel is sensed in the defer period. In a case where the channel is idle in a slot within the defer period, the step proceeds to step (1). If not, the step proceeds to step (6).

(1) The initial value of a counter is acquired. The initial value of the counter may be an integer between 0 and a contention window CW. The initial value of the counter is determined randomly in accordance with a uniform distribution. The initial value of the counter is set in a counter N and the step proceeds to step (2).

(2) In a case where the counter N is greater than 0 and it is selected to subtract the counter N, one is subtracted from the counter N. Afterward, the step proceeds to step (3).

(3) The period of a slot is added and waiting is performed. In addition, a channel is sensed in the additional slot. In a case where the additional slot is idle, the step proceeds to step (4). If not, the step proceeds to step (5).
(4) In a case where the counter N is 0, this procedure is stopped. If not, the step proceeds to step (2).
(5) A defer period is added and waiting is performed. In addition, a channel is sensed until busy is detected in any one of the slots included in the additional defer period or until it is possible to detect all of the slots included in the additional defer period as idle. Afterward, the step proceeds to step (6).
(6) In a case where the channels are sensed to be idle in all of the slots included in the additional defer period, the step proceeds to step (4). If not, the step proceeds to step (5).

After step (4) in the procedure described above is stopped, transmission including data such as PDSCH and PUSCH is performed in the channel.

It is to be noted that, after step (4) in the procedure described above is stopped, transmission does not have to be performed in the channel. In this case, afterward, in a case where the channels are idle in all of the slots and defer periods immediately before the transmission, transmission may be performed without performing the procedure described above. In contrast, in a case where the channel is not idle in any of the slots and defer periods, the channels are sensed to be idle in all of the slots within the additional defer period, and then the step proceeds to step (1) in the procedure described above.

<Details of Second Channel Access Procedure>

In the second channel access procedure, transmission may be performed immediately after the channel is considered idle as a result of sensing at least the fourth waiting time. In contrast, in a case where the channel is not considered idle as a result of sensing at least the fourth waiting time, no transmission is performed.

<Contention Window Adaptation Procedure>

The contention window CW (contention window) used in the first channel access procedure is determined on the basis of a contention window adaptation procedure.

The value of the contention window CW is retained for each of priority classes. In addition, the contention window CW takes a value between the minimum contention window and the maximum contention window. The minimum contention window and the maximum contention window are determined on the basis of the priority class.

The adjustment of the value of the contention window CW is made before step (1) in the first channel access procedure. In a case where the percentage of NACK in an HARQ response corresponding to a shared channel of a reference subframe or a reference HARQ process in at least the contention window adaptation procedure is higher than a threshold, the value of the contention window CW is increased. If not, the value of the contention window CW is set at the minimum contention window.

The value of the contention window CW is increased, for example, on the basis of the expression of $CW=2\cdot(CW+1)-1$.

<Details of Channel Access Procedure in Downlink>

In a case where downlink transmission including PDSCH, PDCCH, and/or EPDCCH is performed in an unlicensed channel, the base station device accesses the channel and performs the downlink transmission on the basis of the first channel access procedure.

In contrast, in a case where downlink transmission including DRS, but including no PDSCH is performed in an unlicensed channel, the base station device accesses the channel and performs the downlink transmission on the basis of the second channel access procedure. It is to be noted that the period of the downlink transmission is preferably smaller than 1 millisecond.

<Details of Channel Access Procedure in Uplink>

In a case where an instruction is issued in an unlicensed channel to perform the first channel access procedure in an uplink grant for scheduling PUSCH, the terminal device performs the first channel access procedure before uplink transmission including the PUSCH.

In addition, in a case where an instruction is issued to perform the second channel access procedure in an uplink grant for scheduling PUSCH, the terminal device performs the second channel access procedure before uplink transmission including the PUSCH.

In addition, for uplink transmission that does not include PUSCH, but includes SRS, the terminal device performs the second channel access procedure before the uplink transmission.

In addition, in a case where the end of the uplink transmission indicated in the uplink grant is within the uplink period (UL duration), the terminal device performs the second channel access procedure before the uplink transmission regardless of the procedure type indicated in the uplink grant.

In addition, in a case where the downlink transmission from the base station is finished and the uplink transmission is then continued with the fourth waiting time interposed therebetween, the terminal device performs the second channel access procedure before the uplink transmission.

Channel Access Procedure of NR in the Present Embodiment

In a channel access procedure in an unlicensed channel using NR, channel sensing that is not beamformed and channel sensing that is beamformed are performed.

The channel sensing that is not beamformed is channel sensing by reception with uncontrolled directivity or channel sensing having no direction information. The channel sensing having no direction information is, for example, channel sensing in which measurement results are averaged in all directions. The transmitting station does not have to recognize the directivity (angle and direction) used in channel sensing.

The channel sensing that is beamformed is channel sensing by reception with controlled directivity or channel sensing having direction information. In other words, it is channel sensing in which a reception beam is pointed in a predetermined direction. A transmitting station having a function of performing channel sensing that is beamformed is able to perform channel sensing once or more by using different directivities.

Performing channel sensing that is beamformed makes it possible to narrow the area to be detected by the sensing. This allows the transmitting station to decrease the frequency of detection of non-interfering communication links and alleviate the exposed terminal problem.

<Channel Access of Frame-Based Equipment (FBE)>

In the channel access (Channel access or Listen before Talk) procedure defined as frame-based equipment (FBE or Frame Based Equipment), a channel is sensed (sensing) one time before transmission. On the basis of a result of the sensing, a determination (vacancy determination) is made as to whether the channel is idle (idle, unoccupied, available, or enable) or busy (busy, occupied, unavailable, or disable). In sensing a channel, the power of the channel for a predetermined waiting time is sensed (sense).

The transmission and/or reception configuration used in frame-based equipment has periodic timing referred to as fixed frame period (Fixed Frame Period).

A fixed frame period is set in channel access of frame-based equipment. The fixed frame period is set between one millisecond and ten milliseconds. The fixed frame period is changeable only once every 200 milliseconds.

In channel access of frame-based equipment, a device senses a channel immediately before transmission from the head of a fixed frame period. The device performs sensing one time by using one slot having 9 microseconds or less. In a case where a result of the channel sensing indicates that the power value is greater than a predetermined power detection threshold, the channel is considered busy. In contrast, in a case where the power value is less than the predetermined power detection threshold, the channel is clear and the device is able to perform transmission. The device is able to perform transmission during a channel occupancy time (Channel Occupancy Time). The device is able to perform transmission a plurality of times without performing sensing if the device is within a channel occupancy time and an inter-transmission gap of transmission performed a plurality of times is sixteen microseconds or less. In contrast, in a case where an inter-transmission gap of transmission performed a plurality of times exceeds sixteen microseconds, the device has to perform additional channel sensing. The device similarly performs sensing one time by using one slot in the additional channel sensing.

A channel occupancy time in channel access of frame-based equipment does not exceed 95% of a fixed frame period. An idle period (Idle Period) in channel access of frame-based equipment is 5% or more of a fixed frame period. It is to be noted that the idle period is 100 microseconds or more.

A response (ACK/NACK or HARQ-ACK) to transmission from a device may be transmitted within a channel occupancy time.

<Preamble Signal>

This Preamble signal (initial signal or wake-up signal) may be generated for downlink detection, PDCCH monitoring reduction, or coexistence/space reuse. In addition, as illustrated in FIG. 4, this Preamble signal is placed in the head of a signal transmitted from the base station 100. The Preamble signal may be transmitted from the base station 100 once every symbol or once every several symbols. The transmission cycle of Preamble signals may be associated with the cycle of PDCCHs or may be independent from the cycle of PDCCHs. To suppress power used by the terminal device 200, it is desirable that the transmission cycle of Preamble signals be independent from the cycle of PDCCHs. In addition, the plurality of these Preamble signals may be placed within a channel occupancy time (Channel Occupancy Time; COT). In a case where a Preamble signal is placed within COT, the Preamble signal may be placed in the head of a slot or may be placed in the middle of a slot. In any case, a preamble signal may be disposed in a 1-slot cycle.

It is desirable that a Preamble signal have about one or two symbols. A Preamble signal may be used for RRM/RLM/CSI measurement. In this case, it is possible to set a Preamble signal as one of RLM-RSs.

It is desirable that a Preamble signal have fixed transmission power if used for RRM/RLM measurement. The transmission power of a Preamble signal may be set in a higher-order (higher) layer for a terminal device. The power ratio between DMRS for PDCCH and a Preamble signal may be set in a higher-order (higher) layer for a terminal device.

In a case where the terminal device 200 detects a Preamble signal, the terminal device 200 starts mini-slot PDCCH monitoring. The mini-slot PDCCH monitoring is to monitor PDCCH in the middle of a slot. As a setting, this is CORESET Configuration associated with a Preamble signal that is different from normal CORESET Configuration. In a case where the terminal device 200 detects no Preamble signal, the terminal device 200 monitors slot-based PDCCH. As a setting, this is CORESET Configuration that is not associated with any start signal.

At least a Preamble signal and DMRS for common PDCCH (including SFI) have a quasi co-location (QCL: Quasi Co-Location) relationship. Assuming that a Preamble signal and DMRS for common PDCCH have a QCL relationship, a terminal device performs signal processing.

A Preamble signal may include one type of sequence and one symbol. FIG. 5 is an explanatory diagram illustrating a configuration example of a Preamble signal. It is preferable to use a sequence such as a ZC sequence or an m sequence having a high orthogonal characteristic (low cross-correlation characteristic) for a Preamble signal having this configuration. The sequence such as a ZC sequence or an m sequence allows for separation even in a case of collision (even in a case where the same resource is used).

A Preamble signal may include one type of sequence and two or more symbols. FIG. 6 is an explanatory diagram illustrating a configuration example of a Preamble signal. In this configuration, resources are allocated on the frequency axis in an interlace manner. This configuration allows cells to use different frequency resources because of frequency reuse, making it possible to increase the detection rate. A sequence such as a Gold sequence having a large number of orthogonal sequences may be used for this Preamble signal.

A Preamble signal may include a combination of two types of sequences and two or more symbols. FIG. 7 is an explanatory diagram illustrating a configuration example of a Preamble signal. It is preferable to use sequences having different properties for this Preamble signal in combination. The sequences having different properties include a sequence such as a ZC sequence or an m sequence having a high orthogonal characteristic and a sequence such as a Gold sequence having a large number of orthogonal sequences. In this configuration, it is possible to use a plurality of sequences having different features and it is thus possible to construct an appropriate signal sequence in accordance with the application. For example, a sequence (e.g., ZC sequence) having light detection load is applied as the first to detect the downlink of a terminal device and a sequence (e.g., m sequence) having low cross-correlation is applied as the second for coexistence/space reuse.

Frequency resources may be further allocated to a Preamble signal in an interlace manner in the configuration illustrated in FIG. 7. FIG. 8 is an explanatory diagram illustrating a configuration example of a Preamble signal. FIG. 8 is an explanatory diagram illustrating a configuration in which frequency resources are allocated in an interlace manner.

Frequency resources may be allocated to only one type of one symbol in a Preamble signal in an interlace manner in the configuration illustrated in FIG. 7. FIG. 9 is an explanatory diagram illustrating a configuration example of a Preamble signal. FIG. 9 is an explanatory diagram illustrating a configuration in which frequency resources allocated to only one type of one symbol in an interlace manner.

Two or more types of sequences may be alternately disposed in a Preamble signal. FIG. 10 is an explanatory diagram illustrating a configuration example of a Preamble signal. FIG. 10 is an explanatory diagram illustrating a configuration in which two types of sequences are alternately disposed. This configuration allows a plurality of types of sequences to be transmitted by using one symbol.

The Preamble signal may have a configuration in which the first sequence is disposed in the middle of the carrier and the second sequence is multiplexed on the remaining frequencies. FIG. 11 is an explanatory diagram illustrating a configuration example of a Preamble signal. Such a configuration facilitates synchronization with the central frequency of the carrier by using the first sequence.

An SS/PBCH block may be used as a Preamble signal. FIG. 12 is an explanatory diagram illustrating a configuration example of a Preamble signal. Such a configuration allows a Preamble signal to be used as a discovery signal (discovery signal) or a signal for initial access. In addition, such a configuration makes it possible to increase the transmission frequency of SS/PBCH blocks.

A preamble of wireless LAN may be used as a Preamble signal. A preamble of wireless LAN may include STF (Short Training Field), LTF (Long Training Field), SIG (Signal Field), a PHY header, and/or a MAC header.

2. Configuration Examples of Respective Devices 2.1. Configuration Example of Base Station FIG. 13 is a block diagram illustrating an example of a configuration of the base station 100 according to the present embodiment. With reference to FIG. 13, the base station 100 includes an antenna unit 110, a wireless communication unit 120, a network communication unit 130, a storage unit 140, and a control unit 150.

(1) Antenna Unit 110

The antenna unit 110 emits a signal into space as radio waves. The signal is outputted by a wireless communication unit 120. In addition, the antenna unit 110 converts radio waves in space into a signal and outputs the signal to the wireless communication unit 120.

(2) Wireless Communication Unit 120

The wireless communication unit 120 transmits and receives signals. For example, the wireless communication unit 120 transmits a downlink signal to a terminal device and receives an uplink signal from the terminal device.

(3) Network Communication Unit 130

The network communication unit 130 transmits and receives information. For example, the network communication unit 130 transmits information to another node and receives information from the other node. For example, the other node described above includes another base station, another relay, another wireless LAN AP (Access Point) or wireless LAN STA (Station), and a core network node.

(4) Storage Unit 140

The storage unit 140 temporarily or permanently stores programs and various kinds of data for operations of the base station 100.

(5) Control Unit 150

The control unit 150 controls the overall operation of the base station 100 and provides various functions of the base station 100. The control unit 150 includes a setting section 151 and a communication control section 153.

The setting section 151 has a function of making a setting regarding communication with the terminal device 200 coupled to the base station 100. For example, the setting section 151 sets (i.e., determines) a channel access scheme to be used by the base station 100 and the terminal device 200. Specifically, the setting section 151 sets which of LBE or FBE is used by the base station 100 and the terminal device 200. In addition, the setting section 151 performs (i.e., determines) a setting for carrier sense performed by the base station 100 and the terminal device 200. The setting section 151 then notifies the terminal device 200 of setting information indicating a channel access scheme to be used by the terminal device 200 and a setting for carrier sense. Here, the setting section 151 makes a setting in an unlicensed band. In other words, the setting section 151 sets a channel access scheme and makes a setting for carrier sense in an unlicensed band. The channel access scheme and the carrier sense are performed between the base station 100 and the terminal device 200. The setting section 151 then notifies the terminal device 200 of the setting information.

The communication control section 153 has a function of controlling communication with the terminal device 200. For example, the communication control section 153 communicates with the terminal device 200 in accordance with a channel access scheme set by the setting section 151. The base station 100 is configured to use LBE and FBE. The communication control section 153 uses any of LBE and FBE to communicate with the terminal device 200. In addition, the communication control section 153 performs carrier sense in accordance with a setting for carrier sense made by the setting section 151.

The control unit 150 may further include another component in addition to these components. In other words, the control unit 150 may perform operations other than those of these components.

2.2. Configuration Example of Terminal Device

FIG. 14 is a block diagram illustrating an example of a configuration of the terminal device 200 according to the present embodiment. With reference to FIG. 14, the terminal device 200 includes an antenna unit 210, a wireless communication unit 220, a storage unit 230, and a control unit 240.

(1) Antenna Unit 210

The antenna unit 210 emits a signal into space as radio waves. The signal is outputted by the wireless communication unit 220. In addition, the antenna unit 210 converts radio waves in space into a signal and outputs the signal to the wireless communication unit 220.

(2) Wireless Communication Unit 220

The wireless communication unit 220 transmits and receives signals. For example, the wireless communication unit 220 receives a downlink signal from a base station and transmits an uplink signal to the base station.

(3) Storage Unit 230

The storage unit 230 temporarily or permanently stores programs and various kinds of data for operations of the terminal device 200.

(4) Control Unit 240

The control unit 240 controls the overall operation of the terminal device 200 and provides various functions of the terminal device 200. The control unit 240 includes a setting section 241 and a communication control section 243.

The setting section 241 has a function of making a setting regarding communication with the base station 100 coupled to the terminal device 200. For example, the setting section 151 sets a channel access scheme to be used on the basis of setting information of which the setting section 151 is notified by the base station 100. In addition, the setting section 151 makes a setting for carrier sense on the basis of the setting information of which the setting section 151 is notified by the base station 100. Here, the setting section 241 makes a setting in an unlicensed band. In other words, the setting section 241 sets a channel access scheme and makes a setting for carrier sense in an unlicensed band on the basis of the setting information. The channel access scheme and the carrier sense are performed between the base station 100 and the terminal device 200.

The communication control section 243 has a function of controlling communication with the base station 100. For example, the communication control section 243 communicates with the base station 100 in accordance with a setting made by the setting section 241. The terminal device 200 is configured to use LBE and FBE. The communication control section 243 uses any of LBE and FBE to communicate with the base station 100. In addition, the communication control section 243 performs carrier sense in accordance with a setting for carrier sense made by the setting section 241.

The control unit 240 may further include another component in addition to these components. In other words, the control unit 240 may perform operations other than those of these components.

3. Technical Features

3.1. Details of Setting Information

Channel Access Scheme

Setting information includes information indicating a channel access scheme to be used by the terminal device 200. The setting information includes at least any of pieces of information described below as the information indicating a channel access scheme to be used.

The setting information may include information indicating whether or not to use FBE. Further, the setting information may include information indicating whether or not to use LBE. Alternatively, the setting information may include information indicating a channel access scheme to be used.

The setting information may include information indicating whether or not synchronization has been established between the base station 100 and another node. Here, examples of the other node include a base station adjacent to the base station 100. For example, in a case where the setting information includes information indicating that synchronization has been established, the terminal device 200 sets FBE as a channel access scheme to be used. If not, the terminal device 200 sets LBE. This allows channel access schemes to be switched in accordance with information regarding synchronization between nodes, making it possible to suppress the occurrence of unfair transmission opportunities between a plurality of nodes using FBE, which has been described above with reference to FIG. 3.

The setting information may include information in which a position and a channel access scheme are associated. The channel access scheme is to be used in a case where the terminal device 200 is positioned at the position. For example, the terminal device 200 uses FBE inside a predetermined area indicated by the setting information and uses LBE outside the predetermined area. The position indicated by the setting information may be a geographical position, a building (floor or room), a cell, or a tracking area. For example, the setting information includes information indicating that LBE is to be used inside a certain building (factory or hospital) and FBE is to be used outside the building. This allows channel access schemes to be switched in accordance with a position.

The information indicating a position may be information indicating a geographical position or information indicating a relative position from a reference position. Further, a unit of a position may be physical distance or radio distance (Radio Distance) expressed from the intensity of reception power caused by the correlation between physical distance and path loss. Specifically, the predetermined area may be an area expressed by a geographical position or an area in which the long-term intensity of reception power received from a wireless device is less than or equal to or greater than or equal to a predetermined threshold.

The information regarding a geographical position may include information regarding latitude and longitude. It is to be noted that the information regarding a geographical position may include information regarding altitude.

The information regarding a relative position may include, for example, information regarding a relative position, relative distance, and/or relative direction from a wireless device (mainly fixed node such as the base station 100) and information (such as an identifier (cell ID) and geographical information of a wireless device) of a wireless device.

The setting information may include information in which a frequency band and a channel access scheme are associated. The channel access scheme is to be used in a case where the terminal device 200 uses the frequency band. For example, the terminal device 200 uses FBE in a predetermined frequency band indicated by the setting information and uses LBE in a frequency band other than the predetermined frequency band. This allows channel access schemes to be switched in accordance with a frequency band. Examples of the predetermined frequency band include a 6-GHz band. Specifically, FBE may be set for a 6-GHz band and LBE is set for a 5-GHz band.

The setting information may include information in which a time and a channel access scheme to be used by the terminal device 200 during the time are associated. For example, the terminal device 200 uses FBE in a predetermined period indicated by the setting information and uses LBE during a time other than the predetermined period. This allows channel access schemes to be switched in accordance with a time.

It is to be noted that the setting information may be information regarding an instruction about a combination of the settings described above. For example, the setting information may concurrently include information indicating whether or not synchronization has been established between the base station 100 and another node and information in which a position and a channel access scheme are associated. The channel access scheme is to be used in a case where the terminal device 200 is positioned at the position. The terminal device 200 is able to apply FBE in a case where synchronization has been established between the base station 100 and another node and the terminal device 200 is positioned in a predetermined area.

Setting for Carrier Sense

Setting information includes information indicating a setting for carrier access to be performed by the terminal device 200.

The setting information may include information indicating a frame configuration in FBE. For example, the setting information includes the ratio between the length and timing of a fixed frame period, a channel occupancy time, and an idle period. It is to be noted that the timing of a fixed frame period means the timing of the head of the fixed frame period. The boundary of a fixed frame period matches at least a symbol boundary in LTE or NR. Further, it is desirable that the head of a fixed frame period match the head of a slot in LTE or NR, but may have offset (Offset). The offset may be set in the terminal device 200.

Notification Method

Various notification methods of setting information are conceivable.

At the timing of initial access, the terminal device 200 may be notified of setting information by using PBCH (Physical Broadcast Channel) or system information (e.g., SIB (System Information Block) 1). In addition, the terminal device 200 may be notified of setting information in the RRC setting of an uplink.

At the timing of handover, setting information may be included in information regarding handover for notification. For example, the terminal device 200 is notified of setting information included in a handover command (Handover Command). For example, the terminal device 200 is notified of setting information included in RRC setting information regarding handover. For example, in a case where no setting information is included, no channel access scheme is changed between a handover source and a handover destination. In a case where setting information is included, a channel access scheme is changed on the basis of the setting information.

In a case where it is possible to dynamically switch channel access schemes, the terminal device 200 may be notified of setting information included in MAC CI, a grant (i.e., DCI (Downlink Control Information)), or a Preamble signal. For example, in a case where no setting information is included, the channel access scheme performed immediately before is performed. In a case where setting information is included, a channel access scheme is performed on the basis of the setting information.

It is to be noted that the notification method may be a combination of what have been described above. For example, in a case where the terminal device 200 is notified by fallback DCI (i.e., DCI format 0_0 or DCI format 1_0) or DCI in a shared search space, the terminal device 200 conforms to the setting information of the RRC setting. If not, the terminal device 200 conforms to the setting information included in the DCI.

3.2. Setting Based on Long-Term Guarantee

A channel access scheme and a setting for carrier sense may be respectively set and made on the basis of a long-term guarantee.

In a case where it is guaranteed in the long term that there are only nodes which use FBE around the base station 100 and the terminal device 200 and synchronization has been established between the nodes that use FBE, FBE is used. If not, LBE is used. This long-term guarantee is given, for example, by law.

The long-term guarantee may be given on the basis of a position. For example, the base station 100 makes a setting to use FBE at a position at which the long-term guarantee is obtained and makes a setting to use LBE at the other positions. In this case, the base station 100 is fixed at that position and is not moved.

The long-term guarantee may be obtained on the basis of a frequency band. For example, the base station 100 makes a setting to use FBE in a frequency band in which the long-term guarantee is obtained and makes a setting to use LBE in the other frequency bands.

The long-term guarantee may be obtained on the basis of a time. For example, the base station 100 makes a setting to use FBE during a time during which the long-term guarantee is obtained and makes a setting to use LBE during the other time. The time during which the long-term guarantee is obtained is set, for example, as a cycle.

This long-term guarantee may be approved and obtained from a database. For example, the base station 100 makes a setting to use FBE in a case where the base station 100 obtains approval from a database to use FBE. The base station 100 makes a setting to use LBE in the other cases.

3.3. Setting Based on Geographical Position

A channel access scheme and a setting for carrier sense may be respectively set and made on the basis of a geographical position.

The setting section 151 may set a channel access scheme to be used for communication between the base station 100 and the terminal device 200 on the basis of the position of the base station 100. In addition, the setting section 151 may set a channel access scheme to be used for communication between the base station 100 and the terminal device 200 on the basis of the position of the terminal device 200.

The setting section 151 makes a setting to use LBE in a case where there is no node that uses LBE around the base station 100 or the terminal device 200 and makes a setting to use FBE in a case where there is no node that uses LBE around the base station 100 or the terminal device 200. The setting section 151 may set a channel access scheme to be used on the basis of information from a database to which the base station 100 is coupled. The database manages, for example, the positional information, RAT, channel access scheme, and the like of a base station adjacent to the base station 100, a relay node, and a node of another RAT (e.g., wireless LAN such as Wi-Fi). The information from a database may include information indicating a channel access scheme to be used or information obtained by combining the pieces of positional information and the channel access schemes of other nodes.

The database manages the communication setting of the base station 100. The database is able to permit the base station 100 coupled to the database to use a radio resource. Further, the database is able to control transmission power, available resources (frequency and time resources), inter-base-station synchronization, and the like for the base station 100 coupled to the database. Further, the database is able to manage channel access. In other words, the database is able to permit a predetermined device to use an exclusive resource that the other devices are not able to access. The database is able to process a portion of the mechanism of SON (Self-Organized Network or Self-Optimization Network).

The database is able to perform radio resource sharing control between a plurality of operators. In other words, the database is coupled to the base stations 100 of a plurality of operators and exchanges pieces of control information regarding radio resource sharing control. The pieces of radio resource sharing control information between the operators may each include PLNM (Public Land Mobile Network), an available radio resource, and a physical cell identity (PCI or Physical Cell Identity).

The database may be included as a portion of the devices in the core network or may be disposed outside the core network.

3.4. Setting Based on Another Node that Uses LBE

A channel access scheme and a setting for carrier sense may be respectively set and made on the basis of another node that uses FBE.

(1) Setting Channel Access Scheme Based on Another Node

The setting section 151 may set a channel access scheme to be used for communication between the base station 100 and the terminal device 200 on the basis of a detection result of another node that uses LBE. For example, the setting section 151 makes a setting to use LBE in a case where another node that uses LBE is detected. The setting section 151 makes a setting to use FBE in a case where no other node that uses LBE is detected. Here, it may be the base station 100 or the terminal device 200 that is in charge of detection. This makes it possible to suppress the occurrence of unfair transmission opportunities between a node that uses FBE and a node that uses LBE.

Setting Based on Detection of Signal Transmitted from Another Node

Another node that uses LBE is detected on the basis of a signal transmitted from the other node. The existence of the other node that uses LBE may be detected by ED (Energy detection). Any threshold may be set for ED. The presence of another node that uses LBE may be detected in a case where it is determined a predetermined number of times or more that the channel is busy.

For example, the setting section 151 makes a setting to use LBE in a case where a signal transmitted from another node that uses LBE is detected even one time. In contrast, the setting section 151 makes a setting to use FBE in a case where the period in which a signal transmitted from another node that uses LBE is not detected is long.

Measurement

A signal transmitted from another node may be detected by measurement (measurement). The base station 100 may make a measurement. Alternatively, the terminal device 200 may make a measurement and reports the measurement to the base station 100. A measurement target may be RSSI (Received Signal Strength Indicator). For example, the setting section 151 makes a setting to use FBE in a case where the reception power from another node that is measured by the base station 100 or reported from the terminal device 200 falls below a predetermined value. The setting section 151 makes a setting to use LBE in a case where the reception power from another node that is measured by the base station 100 or reported from the terminal device 200 does not fall below the predetermined value. In addition, the measurement target may be a channel busy ratio (channel busy ratio). The channel busy ratio is the percentage of time during which the reception power exceeds the predetermined value in a predetermined period. For example, the setting section 151 makes a setting to use FBE in a case where the channel busy ratio falls below a predetermined value (e.g., 10%). The setting section 151 makes a setting to use LBE in a case where the channel busy ratio does not fall below the predetermined value.

Detection of Packet

A signal transmitted from another node may be detected by detecting a packet. A packet may be detected by the base station 100 or the terminal device 200. A packet to be detected is, for example, a beacon of Wi-Fi. For example, the setting section 151 makes a setting to use LBE in a case where a beacon of Wi-Fi is detected. The setting section 151 makes a setting to use FBE in a case where no beacon of Wi-Fi is detected.

Setting Based on Sensor Information Regarding Another Node

Another node that uses LBE may be detected on the basis of sensor information regarding the other node. The sensor information is information obtained by any sensor device such as a radar or an imaging device. For example, the setting section 151 makes a setting to use FBE in a case where it is confirmed by using sensor information obtained by a sensor device mounted on the base station 100 or the terminal device 200 that there is no other node which uses LBE therearound. It is to be noted that another node may also be detected by AI (artificial intelligence) on the basis of the sensor information.

Setting by Use Request/Response-Based Procedure

The setting section 151 may set a channel access scheme to be used for communication between the base station 100 and the terminal device 200 in a use request/request-based procedure. For example, the setting section 151 transmits a use request of FBE to another node before the transmission of predetermined data. The setting section 151 makes a setting to use FBE for channel access performed in a predetermined period in a case where the other node sends a use permission of FBE in response. The setting section 151 makes a setting to use LBE in a case where the other node sends an FBE use prohibition in response or the other node makes no response.

(2) Setting for Carrier Sense Based on Detection Result of Another Node

The setting section 151 may make a setting for carrier sense in accordance with a detection result of another node that uses LBE. For example, the setting section 151 sets a frame configuration in FBE in accordance with a detection result of another node that uses LBE. The setting target may include the length of a channel occupancy time and an idle period in a fixed frame period. It is to be noted that a channel occupancy time and an idle period may be different in length between a downlink and an uplink. The setting target may include the length of a fixed frame period. It is to be noted that a fixed frame period may be different in length between a downlink and an uplink. Appropriately making a setting for carrier sense in FBE makes it possible to reduce unfair transmission opportunities between a node that uses FBE and a node that uses LBE.

3.5. Setting for Each Packet

A channel access scheme and a setting for carrier sense may be respectively set and made on the basis of a packet to be transmitted.

The setting section 151 may set a channel access scheme to be used for communication between the base station 100 and the terminal device 200 for each of packets. The packet here may be a packet transmitted by the base station 100 or a packet transmitted by the terminal device 200.

The setting section 151 may set a channel access scheme to be used on the basis of the packet size. For example, the setting section 151 makes a setting to use FBE in a case where the packet size is small. The setting section 151 makes a setting to use LBE in a case where the packet size is large. This makes it possible to avoid the occupancy of a channel for an unnecessarily long period.

The setting section 151 may set a channel access scheme to be used on the basis of a use case of a packet. For example, the setting section 151 makes a setting to use FBE with respect to a packet related to factory automation (factory automation). In other words, the setting section 151 may set a channel access scheme to be used by the terminal device 200 on the basis of the QoS (Quality of Service) of a packet. It is possible to determine from the QoS whether or not the packet is a packet related to factory automation. For example, the setting section 151 makes a setting to use FBE in a case where the device is installed inside the factory.

The setting section 151 may set a channel access scheme to be used by the terminal device 200 on the basis of whether the packet is periodic or aperiodic. For example, the setting section 151 makes a setting to use FBE with respect to a packet for periodic traffic including periodic control information such as SRS (Sounding Reference Signal), a scheduling request, or a CSI report, a sound, streaming, or the like. The setting section 151 makes a setting to use LBE with respect to a packet for other aperiodic traffic.

3.6. Setting Based on Priority of Signal of Another Node

A channel access scheme and a setting for carrier sense may be respectively set and made on the basis of the priority of a signal of another node.

The setting section 151 sets a channel access scheme to be used for communication between the base station 100 and the terminal device 200 on the basis of the priority of a packet transmitted from another node. For example, the setting section 151 makes a setting to use LBE in a case where a packet having high priority is detected. The setting section 151 makes a setting to use FBE in a case where no packet having high priority is detected. This makes it possible to preventing the transmission of a packet having high priority from another node from being hindered.

It is to be noted that a node may notify an entity therearound of information indicating the priority of a packet. For example, an entity therearound may be notified of information indicating the priority of a packet by using a Preamble signal. Additionally, an entity therearound may be notified of information indicating the priority of a packet by using PDCCH.

3.7. Setting Based on Cycle

A channel access scheme and a setting for carrier sense may be respectively set and made periodically.

The setting section 151 switches channel access schemes to be used for communication between the base station 100 and the terminal device 200 in a predetermined cycle. For example, the setting section 151 makes a setting to use FBE in a predetermined period. The setting section 151 makes a setting to use LBE in the other periods. LBE and FBE are periodically switched. This makes it possible to reduce unfair transmission opportunities as compared with another node.

3.8. Setting Based on Preamble Signal

A channel access scheme and a setting for carrier sense may be respectively set and made on the basis of information carried by a Preamble signal.

The setting section 151 sets a channel access scheme to be used for communication between the base station 100 and the terminal device 200 on the basis of a Preamble signal from another node. In a case where the setting section 151 is instructed to use FBE by information carried by a Preamble signal, the setting section 151 makes a setting to use FBE. If not, the setting section 151 makes a setting to use LBE.

A Preamble signal may include an identifier for distinguishing an NR base station or wireless LAN AP. The identifier may be allocated to a series of sequences or may be expressed by carried bit strings.

Examples of the identifier for distinguishing an NR base station or wireless LAN AP include an operator ID (e.g., PLMN). In a case where operator IDs include ID that does not belong to any operator, the setting section 151 is able to recognize that the signal source is wireless LAN AP. In a case where a terminal device recognizes that the transmission source is wireless LAN AP, the terminal device does not have to perform carrier sense during the channel occupancy time and in the band obtained by the transmission source or does not also have to monitor PDCCH or measure the channel. In a case where a terminal device recognizes that the transmission source is wireless LAN AP, the terminal device may report to the base station 100 later that there is wireless LAN AP therearound.

Examples of the identifier for distinguishing an NR base station or wireless LAN AP include BSS (Basic Service Set) Color. In a case where information that does not belong to any BSS is included in BSS Color, the setting section 151 is able to recognize that the signal source is a base station of LTE, MulteFire, or NR. In a case where a wireless LAN node recognizes that the signal source is a base station, the wireless LAN node does not have to perform carrier sense during the channel occupancy time and in the band obtained by the transmission source or does not also have to decode any signal. In a case where a wireless LAN node recognizes that the transmission source is a base station, the wireless LAN node may report to the wireless RAN AP later that there is a base station therearound.

3.9. Setting Based on RAT

A channel access scheme and a setting for carrier sense may be respectively set and made on the basis of RAT.

The setting section 151 sets a channel access scheme to be used for communication between the base station 100 and the terminal device 200 on the basis of RAT. The terminal device 200 sets a channel access scheme to be used on the basis of the RAT of a base station to which the terminal device 200 is coupled.

3.10. Flow of Process

FIG. 15 is a sequence diagram illustrating an example of a flow of a communication control process executed by the communication system 1 according to the present embodiment. As illustrated in FIG. 15, the base station 100A, the base station 100B, and the terminal device 200 are involved in this sequence.

First, the base station 100A and the base station 100B establish inter-base-station synchronization (step S102). The base station 100A and the base station 100B then set FBE as channel access schemes used for communication with the terminal device 200 coupled to the respective base stations 100A and 100B (steps S104 and 106). Next, the base station 100B notifies the terminal device 200 coupled to the base station 100B that the terminal device 200 is to use FBE and notifies the terminal device 200 coupled to the base station 100B of setting information including a setting for carrier sense in FBE (step S108). The terminal device 200 then sets FBE as a channel access scheme used for communication with the base station 100B (step S110).

3.11. Other Application Examples

A Preamble signal may be used to issue a notification of a time (channel occupancy time) during which a channel is occupied. The time whose notification is issued from the Preamble signal may be a maximum occupiable time or a scheduled transmission time. The time whose notification is issued from the Preamble signal may continue until the transmission timing of the next common PDCCH. The time whose notification is issued from the Preamble signal may a time up to the next uplink resource (e.g., PRACH resource). The time whose notification is issued from the Preamble signal may be updated by the following channel occupancy time information.

A Preamble signal may be used to issue a notification of a band (channel occupancy band) in which a channel is occupied. For example, a terminal device is able to recognize that a channel is occupied in a band in which a Preamble signal is transmitted. For example, information carried by a Preamble signal makes it possible to issue a notification indicating whether or not a channel is occupied in a band other than the band in which the Preamble signal is transmitted.

It is to be noted that it is also possible to issue a notification of a band (channel occupancy band) in which a channel is occupied by using a different method. For example, common PDCCH makes it possible to issue a notification indicating whether or not a channel in a designated band is occupied.

The common PDCCH is used to issue a notification of SFI (Slot Format Indicator). It is desirable that the common PDCCH be sent in the first several symbols of a slot. The cycle in which common PDCCHs are sent is set in the RRC setting.

A processes of monitoring PDCCH and a process of measurement may be switched in accordance with a channel occupancy band. For example, a terminal device does not monitor PDCCH, buffer PDSCH, or measure a channel in a band in which no channel is occupied. In contrast, a terminal device is able to monitor PDCCH, buffer PDSCH, and/or measure a channel in a band in which a channel is occupied.

The base station 100 is able to broadcast, in PBCH, PDSCH that carries SIB1, a message 2 and a message 4 for initial access, and a broadcast SI message and information (subCarrierSpacingCommon) for designating the sub-carrier spacing of PDCCH corresponding to the PDSCH. In a case where information indicating 60 kHz is sent in the information in transmission in an unlicensed band, a terminal device recognizes that PDSCH and PDCCH are sent at 60 kHz. In a case where information indicating 30 kHz is sent, the terminal device recognizes that PDSCH and PDCCH are sent at 60 kHz.

4. Application Examples

The technology according to the present disclosure is applicable to various products.

For example, the base station 100 may be achieved as any type of eNB (evolved Node B) such as macro eNB or small eNB. The small eNB may be eNB such as pico eNB, micro eNB, or home (femto) eNB that covers a cell smaller than a macro cell. Instead, the base station 100 may be achieved as another type of base station such as NodeB or BTS (Base Transceiver Station). The base station 100 may include a main entity (also referred to as base station device) that controls wireless communication and one or more RRHs (Remote Radio Heads) disposed in places different from the place of the main entity. In addition, various types of terminals described below may each operate as the base station 100 by executing a base station function temporarily or permanently.

In addition, for example, the terminal device 200 may be achieved as a mobile terminal such as a smartphone, tablet PC (Personal Computer), notebook PC, a portable game terminal, a portable/dongle mobile router, or a digital camera or an onboard terminal such as a car navigation apparatus. In addition, the terminal device 200 may be achieved as a terminal that performs M2M (Machine To Machine) communication (also referred to as MTC (Machine Type Communication) terminal). Further, the terminal device 200 may be a wireless communication module mounted on each of these terminals (e.g., integrated circuit module including one die).

4.1. Application Examples of Base Station

First Application Example

FIG. 16 is a block diagram illustrating a first example of a schematic configuration of eNB to which the technology according to the present disclosure may be applied. eNB 800 includes one or more antennas 810 and a base station device 820. Each of the antennas 810 and the base station device 820 may be coupled to each other via an RF cable.

Each of the antennas 810 includes a single antenna element or a plurality of antenna elements (e.g., a plurality of antenna elements included in a MIMO antenna). Each of the antennas 810 is used for the base station device 820 to transmit and receive wireless signals. The eNB 800 may include the plurality of antennas 810 as illustrated in FIG. 16 and the plurality of respective antennas 810 may correspond, for example, to a plurality of frequency bands used by the eNB 800. It is to be noted that FIG. 16 illustrates an example in which the eNB 800 includes the plurality of antennas 810, but the eNB 800 may include the single antenna 810.

The base station device 820 includes a controller 821, a memory 822, a network interface 823, and a wireless communication interface 825.

The controller 821 may be, for example, CPU or DSP. The controller 821 operates various functions of a higher layer of the base station device 820. For example, the controller 821 generates a data packet from data in a signal processed by the wireless communication interface 825 and transfers the generated packet via the network interface 823. The controller 821 may generate a bundled packet by bundling pieces of data from a plurality of base band processors and transfer the generated bundled packet. In addition, the controller 821 may also have a logical function of executing control such as radio resource control (Radio Resource Control), radio bearer control (Radio Bearer Control), mobility management (Mobility Management), admission control (Admission Control), or scheduling (Scheduling). In addition, the control may be executed in cooperation with nearby eNB or a core network node. The memory 822 includes RAM and ROM and stores a program executed by the controller 821 and various kinds of control data (e.g., terminal list, transmission power data, scheduling data, and the like).

The network interface 823 is a communication interface for coupling the base station device 820 to a core network 824. The controller 821 may communicate with a core network node or another eNB via the network interface 823. In that case, the eNB 800 and the core network node or the other eNB may be coupled to each other through a logical interface (e.g., S1 interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication scheme such as LTE (Long Term Evolution) or LTE-Advanced. The wireless communication interface 825 provides wireless coupling to a terminal positioned within the cell of the eNB 800 via the antenna 810. The wireless communication interface 825 may typically include a base band (BB) processor 826, an RF circuit 827, and the like. The BB processor 826 may perform, for example, encoding/decoding, modulation/demodulation, multiplexing/demultiplexing, and the like. The BB processor 826 executes various signal processing of each of layers (e.g., L1, MAC (Medium Access Control), RLC (Radio Link Control), and PDCP (Packet Data Convergence Protocol)). The BB processor 826 may have a portion or all of the logical functions described above instead of the controller 821. The BB processor 826 may be a module including a memory having a communication control program stored therein, a processor to execute the program, and a related circuit. The function of the BB processor 826 may be modifiable by updating the program described above. In addition, the module described above may be a card or blade to be inserted into a slot of the base station device 820 or a chip mounted on the card or blade described above. Meanwhile, the RF circuit 827 may include a mixer, a filter, an amplifier, and the like. The RF circuit 827 transmits and receives wireless signals via the antenna 810.

The wireless communication interface 825 may include the plurality of BB processors 826 as illustrated in FIG. 16 and the plurality of respective BB processors 826 may correspond, for example, to a plurality of frequency bands used by the eNB 800. In addition, the wireless communication interface 825 may also include the plurality of RF circuits 827 as illustrated in FIG. 16 and the plurality of respective RF circuits 827 may correspond, for example, to a plurality of antenna elements. It is to be noted that FIG. 16 illustrates an example in which the wireless communication interface 825 includes the plurality of BB processors 826 and the plurality of RF circuits 827, but the wireless communication interface 825 may also include the single BB processor 826 or the single RF circuit 827.

In the eNB 800 illustrated in FIG. 16, one or more components (the setting section 151 and/or the communication control section 153) included in the control unit 150 described with reference to FIG. 13 may be implemented in the wireless communication interface 825. Alternatively, at least a portion of these components may be implemented in the controller 821. As an example, the eNB 800 may be mounted with a module including a portion (e.g., BB processor 826) or all of the components of the wireless communication interface 825 and/or the controller 821 and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the eNB 800 and the wireless communication interface 825 (e.g., BB processor 826) and/or the controller 821 may execute the program. As described above, the eNB 800, the base station device 820, or the module described above may be provided as a device including the one or more components described above and the program for causing a processor to function as the one or more components described above may be provided. In addition, there may be provided a readable recording medium having the above-described program recorded thereon.

In addition, the wireless communication unit 120 described with reference to FIG. 13 may be implemented in the wireless communication interface 825 (e.g., RF circuit 827) in the eNB 800 illustrated in FIG. 16. In addition, the antenna unit 110 may be implemented in the antenna 810. In addition, the network communication unit 130 may be implemented in the controller 821 and/or the network interface 823. In addition, the storage unit 140 may be implemented in the memory 822.

Second Application Example

FIG. 17 is a block diagram illustrating a second example of a schematic configuration of eNB to which the technology according to the present disclosure may be applied. eNB 830 includes one or more antennas 840, a base station device 850, and RRH 860. Each of the antennas 840 and the RRH 860 may be coupled to each other via an RF cable. In addition, the base station device 850 and the RRH 860 may be coupled to each other through a high-speed line such as an optical fiber cable.

Each of the antennas 840 includes a single antenna element or a plurality of antenna elements (e.g., a plurality of antenna elements included in a MIMO antenna). Each of the antennas 840 is used for the RRH 860 to transmit and receive wireless signals. The eNB 830 may include the plurality of antennas 840 as illustrated in FIG. 17 and the plurality of respective antennas 840 may correspond, for example, to a plurality of frequency bands used by the eNB 830. It is to be noted that FIG. 17 illustrates an example in which the eNB 830 includes the plurality of antennas 840, but the eNB 830 may include the single antenna 840.

The base station device 850 includes a controller 851, a memory 852, a network interface 853, a wireless communication interface 855, and a coupling interface 857. The controller 851, the memory 852, and the network interface 853 are similar to the controller 821, the memory 822, and the network interface 823 described with reference to FIG. 16.

The wireless communication interface 855 supports any cellular communication scheme such as LTE or LTE-Advanced and provides wireless coupling to a terminal positioned in a sector corresponding to the RRH 860 via the RRH 860 and the antenna 840. The wireless communication interface 855 may typically include a BB processor 856 and the like. The BB processor 856 is similar to the BB processor 826 described with reference to FIG. 16 except that the BB processor 856 is coupled to an RF circuit 864 of the RRH 860 via the coupling interface 857. The wireless communication interface 855 may include the plurality of BB processors 856 as illustrated in FIG. 17 and the plurality of respective BB processors 856 may correspond, for example, to a plurality of frequency bands used by the eNB 830. It is to be noted that FIG. 17 illustrates an example in which the wireless communication interface 855 includes the plurality of BB processors 856, but the wireless communication interface 855 may also include the single BB processor 856.

The coupling interface 857 is an interface for coupling the base station device 850 (wireless communication interface 855) to the RRH 860. The coupling interface 857 may be a communication module for communication on the high-speed line described above. The communication module couples the base station device 850 (wireless communication interface 855) and the RRH 860.

In addition, the RRH 860 includes a coupling interface 861 and a wireless communication interface 863.

The coupling interface 861 is an interface for coupling the RRH 860 (wireless communication interface 863) to the base station device 850. The coupling interface 861 may be a communication module for communication on the high-speed line described above.

The wireless communication interface 863 transmits and receives wireless signals via the antenna 840. The wireless communication interface 863 may typically include an RF circuit 864 and the like. The RF circuit 864 may include a mixer, a filter, an amplifier, and the like. The RF circuit 864 transmits and receives wireless signals via the antenna 840. The wireless communication interface 863 may also include the plurality of RF circuits 864 as illustrated in FIG. 17 and the plurality of respective RF circuits 864 may correspond, for example, to a plurality of antenna elements. It is to be noted that FIG. 17 illustrates an example in which the wireless communication interface 863 includes the plurality of RF circuits 864, but the wireless communication interface 863 may also include the single RF circuit 864.

In the eNB 830 illustrated in FIG. 17, one or more components (the setting section 151 and/or the communication control section 153) included in the control unit 150 described with reference to FIG. 13 may be implemented in the wireless communication interface 855 and/or the wireless communication interface 863. Alternatively, at least a portion of these components may be implemented in the controller 851. As an example, the eNB 830 may be mounted with a module including a portion (e.g., BB processor 856) or all of the components of the wireless communication interface 855 and/or the controller 851 and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the eNB 830 and the wireless communication interface 855 (e.g., BB processor 856) and/or the controller 851 may execute the program. As described above, the eNB 830, the base station device 850, or the module described above may be provided as a device including the one or more components described above and the program for causing a processor to function as the one or more components described above may be provided. In addition, there may be provided a readable recording medium having the above-described program recorded thereon.

In addition, the wireless communication unit 120 described, for example, with reference to FIG. 13 may be implemented in the wireless communication interface 863 (e.g., RF circuit 864) in the eNB 830 illustrated in FIG. 17. In addition, the antenna unit 110 may be implemented in the antenna 840. In addition, the network communication unit 130 may be implemented in the controller 851 and/or the network interface 853. In addition, the storage unit 140 may be implemented in the memory 852.

4.2. Application Examples of Terminal Device

First Application Example

FIG. 18 is a block diagram illustrating an example of a schematic configuration of a smartphone 900 to which the technology according to the present disclosure may be applied. The smartphone 900 includes a processor 901, a memory 902, a storage 903, an external coupling interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, CPU or SoC (System on Chip). The processor 901 controls functions of an application layer and another layer of the smartphone 900. The memory 902 includes RAM and ROM and stores a program that is executed by the processor 901 and data. The storage 903 may include a storage medium such as a semiconductor memory or a hard disk. The external coupling interface 904 is an interface for coupling an externally attached device such as a memory card or a USB (Universal Serial Bus) device to the smartphone 900.

The camera 906 includes, for example, an imager such as CCD (Charge Coupled Device) or CMOS (Complementary Metal Oxide Semiconductor). The camera 906 generates a captured image. The sensor 907 may include a sensor group including, for example, a positioning sensor, a gyro sensor, a geomagnetic sensor, an acceleration sensor, and the like. The microphone 908 converts a sound that is inputted to the smartphone 900 to a sound signal. The input device 909 includes, for example, a touch sensor that detects touch onto the screen of the display device 910, a keypad, a keyboard, a button, a switch, or the like. The input device 909 receives an operation or an information input from a user. The display device 910 includes a screen such as a liquid crystal display (LCD) or an organic light-emitting diode (OLED) display. The display device 910 displays an output image of the smartphone 900. The speaker 911 converts a sound signal that is outputted from the smartphone 900 to a sound.

The wireless communication interface 912 supports any cellular communication scheme such as LTE or LTE-Advanced and executes wireless communication. The wireless communication interface 912 may typically include a BB processor 913, an RF circuit 914, and the like. The BB processor 913 may perform, for example, encoding/decoding, modulation/demodulation, multiplexing/demultiplexing, and the like. The BB processor 913 executes various kinds of signal processing for wireless communication. Meanwhile, the RF circuit 914 may include a mixer, a filter, an amplifier, and the like. The RF circuit 914 transmits and receives wireless signals via the antenna 916. The wireless communication interface 912 may also be a one-chip module that has the BB processor 913 and the RF circuit 914 integrated thereon. The wireless communication interface 912 may include the plurality of BB processors 913 and the plurality of RF circuits 914 as illustrated in FIG. 18. It is to be noted that FIG. 18 illustrates an example in which the wireless communication interface 912 includes the plurality of BB processors 913 and the plurality of RF circuits 914, but the wireless communication interface 912 may also include the single BB processor 913 or the single RF circuit 914.

Further, in addition to a cellular communication scheme, the wireless communication interface 912 may support another type of wireless communication scheme such as a short-distance wireless communication scheme, a near field communication scheme, or a wireless LAN (Local Area Network) scheme. In that case, the wireless communication interface 912 may include the BB processor 913 and the RF circuit 914 for each wireless communication scheme.

Each of the antenna switches 915 switches coupling destinations of the antennas 916 between the plurality of circuits (e.g., circuits for different wireless communication schemes) included in the wireless communication interface 912.

Each of the antennas 916 includes a single antenna element or a plurality of antenna elements (e.g., a plurality of antenna elements included in a MIMO antenna). Each of the antennas 916 is used for the wireless communication interface 912 to transmit and receive wireless signals. The smartphone 900 may include the plurality of antennas 916 as illustrated in FIG. 18. It is to be noted that FIG. 18 illustrates an example in which the smartphone 900 includes the plurality of antennas 916, but the smartphone 900 may include the single antenna 916.

Further, the smartphone 900 may include the antenna 916 for each wireless communication scheme. In that case, the antenna switches 915 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 18 via a power supply line that is partially illustrated in the diagram as a dashed line. The auxiliary controller 919 operates, for example, a minimally necessary function of the smartphone 900 in a sleep mode.

In the smartphone 900 illustrated in FIG. 18, one or more components (the setting section 241 and/or the communication control section 243) included in the control unit 240 described with reference to FIG. 14 may be implemented in the wireless communication interface 912. Alternatively, at least a portion of these components may be implemented in the processor 901 or the auxiliary controller 919. As an example, the smartphone 900 may be mounted with a module including a portion (e.g., BB processor 913) or all of the components of the wireless communication interface 912, the processor 901, and/or the auxiliary controller 919 and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the smartphone 900 and the wireless communication interface 912 (e.g., BB processor 913), the processor 901, and/or the auxiliary controller 919 may execute the program. As described above, the smartphone 900 or the module described above may be provided as a device including the one or more components described above and the program for causing a processor to function as the one or more components described above may be provided. In addition, there may be provided a readable recording medium having the above-described program recorded thereon.

In addition, the wireless communication unit 220 described, for example, with reference to FIG. 14 may be implemented in the wireless communication interface 912 (e.g., RF circuit 914) in the smartphone 900 illustrated in FIG. 18. In addition, the antenna unit 210 may be implemented in the antenna 916. In addition, the storage unit 230 may be implemented in the memory 902.

Second Application Example

FIG. 19 is a block diagram illustrating an example of a schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, CPU or SoC. The processor 921 controls the navigation function and the other functions of the car navigation apparatus 920. The memory 922 includes RAM and ROM and stores a program that is executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor, and the like. The data interface 926 is, for example, coupled to an in-vehicle network 941 via a terminal that is not illustrated and acquires data such as vehicle speed data generated on the vehicle side.

The content player 927 reproduces content stored in a storage medium (e.g., CD or DVD) to be inserted into the storage medium interface 928. The input device 929 includes, for example, a touch sensor that detects touch onto the screen of the display device 930, a keypad, a keyboard, a button, a switch, or the like. The input device 929 receives an operation or an information input from a user. The display device 930 includes a screen such as LCD or an OLED display and displays an image of the navigation function or content to be reproduced. The speaker 931 outputs a sound of the navigation function or content to be reproduced.

The wireless communication interface 933 supports any cellular communication scheme such as LTE or LTE-Advanced and executes wireless communication. The wireless communication interface 933 may typically include a BB processor 934, an RF circuit 935, and the like. The BB processor 934 may perform, for example, encoding/decoding, modulation/demodulation, multiplexing/demultiplexing, and the like. The BB processor 934 executes various kinds of signal processing for wireless communication. Meanwhile, the RF circuit 935 may include a mixer, a filter, an amplifier, and the like. The RF circuit 935 transmits and receives wireless signals via the antenna 937. The wireless communication interface 933 may also be a one-chip module that has the BB processor 934 and the RF circuit 935 integrated thereon. The wireless communication interface 933 may include the plurality of BB processors 934 and the plurality of RF circuits 935 as illustrated in FIG. 19. It is to be noted that FIG. 19 illustrates an example in which the wireless communication interface 933 includes the plurality of BB processors 934 and the plurality of RF circuits 935, but the wireless communication interface 933 may also include the single BB processor 934 or the single RF circuit 935.

Further, in addition to a cellular communication scheme, the wireless communication interface 933 may support another type of wireless communication scheme such as a short-distance wireless communication scheme, a near field communication scheme, or a wireless LAN scheme. In that case, the wireless communication interface 933 may include the BB processor 934 and the RF circuit 935 for each wireless communication scheme.

Each of the antenna switches 936 switches coupling destinations of the antennas 937 between the plurality of circuits (e.g., circuits for different wireless communication schemes) included in the wireless communication interface 933.

Each of the antennas 937 includes a single antenna element or a plurality of antenna elements (e.g., a plurality of antenna elements included in a MIMO antenna). Each of the antennas 937 is used for the wireless communication interface 933 to transmit and receive wireless signals. The car navigation apparatus 920 may include the plurality of antennas 937 as illustrated in FIG. 19. It is to be noted that FIG. 19 illustrates an example in which the car navigation apparatus 920 includes the plurality of antennas 937, but the car navigation apparatus 920 may include the single antenna 937.

Further, the car navigation apparatus 920 may include the antenna 937 for each wireless communication scheme. In that case, the antenna switches 936 may be omitted from the configuration of the car navigation apparatus 920.

The battery 938 supplies power to each block of the car navigation apparatus 920 illustrated in FIG. 19 via a power supply line that is partially illustrated in the diagram as a dashed line. In addition, the battery 938 accumulates power supplied from the vehicle side.

In the car navigation apparatus 920 illustrated in FIG. 19, one or more components (the setting section 241 and/or the communication control section 243) included in the control unit 240 described with reference to FIG. 14 may be implemented in the wireless communication interface 933. Alternatively, at least a portion of these components may be implemented in the processor 921. As an example, the car navigation apparatus 920 may be mounted with a module including a portion (e.g., BB processor 934) or all of the components of the wireless communication interface 933 and/or the processor 921 and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the car navigation apparatus 920 and the wireless communication interface 933 (e.g., BB processor 934) and/or the processor 921 may execute the program. As described above, the car navigation apparatus 920 or the module described above may be provided as a device including the one or more components described above and the program for causing a processor to function as the one or more components described above may be provided. In addition, there may be provided a readable recording medium having the above-described program recorded thereon.

In addition, the wireless communication unit 220 described, for example, with reference to FIG. 14 may be implemented in the wireless communication interface 933 (e.g., RF circuit 935) in the car navigation apparatus 920 illustrated in FIG. 19. In addition, the antenna unit 210 may be implemented in the antenna 937. In addition, the storage unit 230 may be implemented in the memory 922.

In addition, the technology according to the present disclosure may also be achieved as an in-vehicle system (or vehicle) 940 including one or more blocks of the car navigation apparatus 920 described above, the in-vehicle network 941, and a vehicle-side module 942. The vehicle-side module 942 generates vehicle-side data such as vehicle speed, engine speed, or trouble information and outputs the generated data to the in-vehicle network 941.

5. Conclusion

The technology according to the embodiment of the present disclosure has been described above in detail with reference to FIGS. 1 to 19. As described above, the terminal device 200 according to the present embodiment is configured to use the first scheme and the second scheme as channel access schemes. In the first scheme, the terminal device 200 performs carrier sense at any timing. In the second scheme, the terminal device 200 performs carrier sense at predetermined timing. The base station 100 notifies the terminal device 200 of setting information regarding a channel access scheme to be used and carrier sense. The terminal device 200 then sets a channel access scheme to be used and makes a setting for carrier sense on the basis of the setting information of which the terminal device 200 is notified by the base station 100. In the present embodiment, it is possible to flexibly set a channel access scheme and flexibly make a setting for carrier sense. This makes it possible to suppress or reduce the occurrence of unfair transmission opportunities between nodes and achieve fair channel access.

The preferred embodiment of the present disclosure has/ have been described above in detail with reference to the accompanying drawings, but the technical scope of the present disclosure is not limited to the embodiment. A person skilled in the art may find various alterations and modifications within the scope of the appended claims, and it should be understood that they will naturally come under the technical scope of the present disclosure.

In addition, the processes described by using the flowcharts and the sequence diagrams in this specification do not necessarily have to be executed in the illustrated order. Some of the processing steps may be executed in parallel. In addition, an additional processing step may be adopted, and some of the processing steps may be omitted.

In addition, the effects described herein are merely illustrative and exemplary, but not limitative. In other words, the technology according to the present disclosure may exert other effects that are apparent to those skilled in the art from the description herein in addition to the effects described above or in place of the effects described above.

It is to be noted that the following configurations also fall within the technical scope of the present disclosure.

(1)

A base station including
a control unit that notifies a terminal device of setting information regarding a channel access scheme to be used and carrier sense, the terminal device being configured to use, as channel access schemes, a first scheme in which the terminal device performs carrier sense at any timing and a second scheme in which the terminal device performs carrier sense at predetermined timing.

(2)

The base station according to (1), in which the setting information includes information indicating whether or not to use the second scheme.

(3)

The base station according to (1) or (2), in which the setting information includes information indicating whether or not synchronization has been established between the base station and another node.

(4)

The base station according to any one of (1) to (3), in which the setting information includes information in which a position and a channel access scheme are associated, the channel access scheme being to be used in a case where the terminal device is positioned at the position.

(5)

The base station according to any one of (1) to (4), in which the setting information includes information in which a frequency band and a channel access scheme are associated, the channel access scheme being to be used in a case where the terminal device uses the frequency band.

(6)

The base station according to any one of (1) to (5), in which the setting information includes information in which a time and a channel access scheme are associated, the channel access scheme being to be used by the terminal device during the time.

(7)

The base station according to any one of (1) to (6), in which the setting information includes information indicating a frame configuration in the second scheme.

(8)

The base station according to any one of (1) to (7), in which the control unit sets a channel access scheme to be used for communication with the terminal device on the basis of a position of the base station.

(9)

The base station according to any one of (1) to (8), in which the control unit sets a channel access scheme to be used for communication with the terminal device on the basis of a detection result of another node that uses the first scheme.

(10)

The base station according to (9), in which the other node that uses the first scheme is detected on the basis of a signal transmitted from the other node.

(11)

The base station according to (9) or (10), in which the other node that uses the first scheme is detected on the basis of sensor information regarding the other node.

(12)

The base station according to any one of (1) to (11), in which the control unit sets a frame configuration in the second scheme in accordance with a detection result of another node that uses the first scheme.

(13)

The base station according to any one of (1) to (12), in which the control unit sets a channel access scheme to be used for communication with the terminal device on the basis of priority of a packet transmitted from another node.

(14)

The base station according to any one of (1) to (13), in which the control unit switches channel access schemes in a predetermined cycle, the channel access schemes being to be used for communication with the terminal device.

(15)

The base station according to any one of (1) to (14), in which the first scheme includes LBE (Load-based equipment), and the second scheme includes FBE (Frame-based equipment).

(16)

A terminal device configured to use, as channel access schemes, a first scheme in which the terminal device performs carrier sense at any timing and a second scheme in which the terminal device performs carrier sense at predetermined timing, the terminal device including a control unit that sets a channel access scheme to be used and makes a setting for carrier sense on the basis of setting information regarding a channel access scheme to be used and carrier sense, the terminal device being notified of the setting information by a base station.

(17)

A method that is executed by a processor, the method including notifying a terminal device of setting information regarding a channel access scheme to be used and carrier sense, the terminal device being configured to use, as channel access schemes, a first scheme in which the terminal device performs carrier sense at any timing and a second scheme in which the terminal device performs carrier sense at predetermined timing.

(18)

A method that is executed by a terminal device, the terminal device being configured to use, as channel access schemes, a first scheme in which the terminal device performs carrier sense at any timing and a second scheme in which the terminal device performs carrier sense at predetermined timing, the method including
    setting a channel access scheme to be used and making a setting for carrier sense on the basis of setting information regarding a channel access scheme to be used and carrier sense, the terminal device being notified of the setting information by a base station.

(19)

A recording medium having a program recorded thereon, the program causing a computer to function as
    a control unit that notifies a terminal device of setting information regarding a channel access scheme to be used and carrier sense, the terminal device being configured to use, as channel access schemes, a first scheme in which the terminal device performs carrier sense at any timing and a second scheme in which the terminal device performs carrier sense at predetermined timing.

(20)

A recording medium having a program recorded thereon, the program causing a computer to function as a control unit, the computer controlling a terminal device configured to use, as channel access schemes, a first scheme in which the terminal device performs carrier sense at any timing and a second scheme in which the terminal device performs carrier sense at predetermined timing, the control unit setting a channel access scheme to be used and making a setting for carrier sense on the basis of setting information regarding a channel access scheme to be used and carrier sense, the terminal device being notified of the setting information by a base station.

REFERENCE SIGNS LIST 1 communication system
11 cell
12 core network
13 PDN
100 base station
110 antenna unit
120 wireless communication unit
130 network communication unit
140 storage unit
150 control unit
151 setting section
153 communication control section 200 terminal device
210 antenna unit
220 wireless communication unit
230 storage unit
240 control unit
241 setting section
243 communication control section

The invention claimed is:

1. A first base station, comprising:
a control unit configured to notify a terminal device of setting information that indicates both:
information regarding a channel access scheme, and
information regarding a setting for channel sense,
wherein
the information regarding the setting for the channel sense indicates information regarding a frame period in the channel access scheme, and
the setting information allows the terminal device to use, as the channel access scheme, at least one of:
a first channel access scheme in which the terminal device executes the channel sense at a first timing, or
a second channel access scheme in which the terminal device executes the channel sense at a second timing,
wherein the setting information includes information indicating establishment of synchronization between the first base station and a second base station.

2. The first base station according to claim 1, wherein the setting information includes information indicating whether to use the second channel access scheme.

3. The first base station according to claim 1, wherein
the setting information includes information in which a position of the terminal device and the channel access scheme for the terminal device are associated, and
the first channel access scheme or the second channel access scheme is used by the terminal device based on the position of the terminal device.

4. The first base station according to claim 1, wherein
the setting information includes information in which a frequency band used by the terminal device and the channel access scheme for the terminal device are associated, and
the first channel access scheme or the second channel access scheme is used by the terminal device based on the frequency band.

5. The first base station according to claim 1, wherein
the setting information includes information in which a time for using the channel access scheme by the terminal device and the channel access scheme for the terminal device are associated, and
the first channel access scheme is used by the terminal device for a first specific period and the second channel access scheme is used by the terminal device for a second specific period.

6. The first base station according to claim 1, wherein the setting information includes information indicating a frame configuration in the second channel access scheme.

7. The first base station according to claim 1, wherein the control unit is further configured to set, based on a position of the first base station, the channel access scheme for communication with the terminal device.

8. The first base station according to claim 1, wherein the control unit is further configured to:
detect the second base station that uses the first channel access scheme; and
set, based on the detection of the second base station, the channel access scheme for communication with the terminal device.

9. The first base station according to claim 8, wherein the control unit is further configured to detect, based on a signal transmitted from the second base station, the second base station that uses the first channel access scheme.

10. The first base station according to claim 8, wherein the control unit is further configured to detect, based on sensor information regarding the second base station, the second base station that uses the first channel access scheme.

11. The first base station according to claim 1, wherein the control unit is further configured to set a frame configuration in the second channel access scheme according to a detection result of the second base station that uses the first channel access scheme.

12. The first base station according to claim 1, wherein the control unit is further configured to set, based on a priority of a packet transmitted from the second base station, the channel access scheme for communication with the terminal device.

13. The first base station according to claim 1, wherein the control unit is configured to switch the channel access scheme, used for communication with the terminal device, in a specific cycle.

14. The first base station according to claim 1, wherein
the first channel access scheme includes LBE (Load-based equipment), and
the second channel access scheme includes FBE (Frame-based equipment).

15. The first base station according to claim 1, wherein
in a case where the terminal device uses the first channel access scheme, the control unit is further configured to sense a channel at the first timing immediately before transmission of a signal, and
the transmission of the signal is at a beginning of a period associated with the first channel access scheme.

16. The first base station according to claim 15, wherein in a case where the terminal device uses the second channel access scheme, the control unit is further configured to sense the channel at the second timing different from the first timing.

17. The first base station according to claim 15, wherein the control unit is further configured to determine, based on the setting information, a length of the period associated with the first channel access scheme.

18. A terminal device, comprising:
a control unit configured to:
receive, from a first base station, setting information that indicates both:
information regarding a channel access scheme, and
information regarding a setting for channel sense, wherein the information regarding the setting for the channel sense indicates information regarding a frame period in the channel access scheme;
set the channel access scheme based on the received setting information; and
generate the setting for the channel sense, based on the received setting information, wherein the set channel access scheme is at least one of:
a first channel access scheme in which the terminal device is configured to execute the channel sense at a first timing, or
a second channel access scheme in which the terminal device is configured to execute the channel sense at a second timing, and wherein the setting information includes information indicating establishment of synchronization between the first base station and a second base station.

19. A method, comprising:
in a first base station:
notifying a terminal device of setting information that indicates both:
information regarding a channel access scheme, and
information regarding a setting for channel sense, wherein
the information regarding the setting for the channel sense indicates information regarding a frame period in the channel access scheme, and
the terminal device uses, as the channel access scheme, at least one of:
a first channel access scheme in which the terminal device executes the channel sense at a first timing, or
a second channel access scheme in which the terminal device executes the channel sense at a second timing,
wherein the setting information includes information indicating establishment of synchronization between the first base station and a second base station.

20. A method, comprising:
in a terminal device:
receiving, from a first base station, setting information that indicates both:
information regarding a channel access scheme, and
information regarding a setting for channel sense, wherein the information regarding the setting for the channel sense indicates information regarding a frame period in the channel access scheme;
setting the channel access scheme based on the received setting information; and
generating the setting for the channel sense, based on the received setting information, wherein the set channel access scheme is at least one of:
a first channel access scheme in which the terminal device executes the channel sense at a first timing, or
a second channel access scheme in which the terminal device executes the channel sense at a second timing, and
wherein the setting information includes information indicating establishment of synchronization between the first base station and a second base station.

21. A non-transitory computer-readable medium having stored thereon, computer-executable instructions which, when executed by a processor of a first base station, cause the processor to execute operations, the operations comprising:
notifying a terminal device of setting information that indicates both:
information regarding a channel access scheme, and
information regarding a setting for channel sense, wherein
the information regarding the setting for the channel sense indicates information regarding a frame period in the channel access scheme, and
the terminal device uses, as the channel access scheme, at least one of:
a first channel access scheme in which the terminal device executes the channel sense at a first timing, or
a second channel access scheme in which the terminal device executes the channel sense at a second timing,
wherein the setting information includes information indicating establishment of synchronization between the first base station and a second base station.

22. A non-transitory computer-readable medium having stored thereon, computer-executable instructions which, when executed by a processor of a terminal device, cause the processor to execute operations, the operations comprising:
receiving, from a first base station, setting information that indicates both:
information regarding a channel access scheme, and
information regarding a setting for channel sense, wherein the information regarding the setting for the channel sense indicates information regarding a frame period in the channel access scheme;
setting the channel access scheme based on the received setting information; and
generating the setting for the channel sense, based on the received setting information, wherein the set channel access scheme is at least one of:
a first channel access scheme in which the terminal device executes the channel sense at a first timing, or
a second channel access scheme in which the terminal device executes the channel sense at a second timing, and
wherein the setting information includes information indicating establishment of synchronization between the first base station and a second base station.

* * * * *